United States Patent [19]
Aoki

[11] Patent Number: 5,842,050
[45] Date of Patent: Nov. 24, 1998

[54] ELECTRONIC STILL VIDEO CAMERA HAVING ELECTRO-DEVELOPING RECORDING MEDIUM

[75] Inventor: Harumi Aoki, Tokyo, Japan

[73] Assignee: Asahi Kogaku Kogyo Kabushiki Kaisha, Tokyo, Japan

[21] Appl. No.: 577,926

[22] Filed: Dec. 22, 1995

[30] Foreign Application Priority Data

Dec. 22, 1994 [JP] Japan ................................. 6-335971
Dec. 22, 1994 [JP] Japan ................................. 6-335974
Dec. 22, 1994 [JP] Japan ................................. 6-335975
Dec. 22, 1994 [JP] Japan ................................. 6-335977
Dec. 22, 1994 [JP] Japan ................................. 6-335978

[51] Int. Cl.$^6$ .................................................. G03B 17/50
[52] U.S. Cl. ........................................................... 396/30
[58] Field of Search ............................... 396/30, 429, 303, 396/389, 391, 392, 284, 285; 348/64, 108, 110, 220, 209, 731, 790.2; 399/3, 4; 358/487, 909.1

[56] References Cited

U.S. PATENT DOCUMENTS

| | | | |
|---|---|---|---|
| 4,956,713 | 9/1990 | Takanashi et al. | 358/209 |
| 5,416,560 | 5/1995 | Taka | 354/471 |
| 5,424,156 | 6/1995 | Aoki et al. | 430/59 |
| 5,424,772 | 6/1995 | Aoki et al. | 348/207 |
| 5,434,618 | 7/1995 | Hayashi et al. | 348/231 |
| 5,523,784 | 6/1996 | Nagano | 348/207 |
| 5,576,757 | 11/1996 | Roberts et al. | 348/207 |
| 5,589,952 | 12/1996 | Sato et al. | 358/487 |
| 5,612,737 | 3/1997 | Nagano | 348/207 |
| 5,638,103 | 6/1997 | Obata et al. | 347/164 |

FOREIGN PATENT DOCUMENTS

| | | |
|---|---|---|
| 0327236 | 8/1989 | European Pat. Off. . |
| 229081 | 1/1990 | Japan . |
| 5-2280 | 1/1993 | Japan . |
| 5-24706 | 4/1993 | Japan . |
| 5150251 | 6/1993 | Japan . |
| 6313894 | 11/1994 | Japan . |

*Primary Examiner*—Howard B. Blankenship
*Assistant Examiner*—John Chizmar
*Attorney, Agent, or Firm*—Greenblum & Bernstein, P.L.C.

[57] ABSTRACT

An electronic still video camera has an electro-developing recording medium. As soon as an optical image is formed on the medium, the image is recorded and developed as a visible image therein. The developed image is electronically read as image data by a line sensor, and the read image data may be stored in an IC memory card, a floppy disk, a hard disk or the like. Optionally, the read image data may be transferred from the camera to an external device such as a computer, a TV monitor or the like. The developed image can be thermally erased from the medium by using an electric heater. When one of: the formation of the optical image on the medium is carried out; the reading of the image data from the developed image of the medium: and the erasing of the developed image from the medium is carried out, the remaining operations are enabled.

50 Claims, 24 Drawing Sheets

Fig. 11
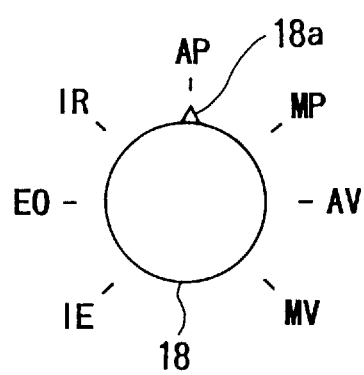
Fig. 12
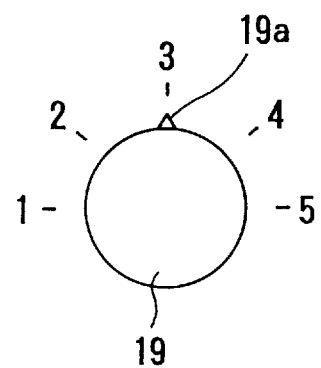
Fig. 13
|   | X    | Y    |
|---|------|------|
| 1 | 640  | 480  |
| 2 | 768  | 512  |
| 3 | 1536 | 1024 |
| 4 | 3072 | 2048 |
| 5 | 4096 | 3072 |

ELECTRONIC STILL VIDEO CAMERA HAVING ELECTRO-DEVELOPING RECORDING MEDIUM

BACKGROUND OF THE INVENTION

1. Field of the Invention

The present invention relates to an electronic still video camera having an electro-developing recording medium in which an optical image obtained through a photographing lens system is electronically and directly recorded and developed as a visible image in very little time.

2. Description of the Related Art

Conventionally, silver halide photographic material is generally used as a material for recording an optical image. Silver halide photographic material has high optical sensitivity and high resolution, and the economical efficiency thereof is excellent. However, silver halide photographic material has drawbacks in that not only is the developing process cumbersome but also a visible image cannot be obtained at the same time as photography. A dry-type developing method has been developed to simplify the developing process. However, simultaneous development in which a visible image is obtained upon photography is impossible in the dry-type developing method.

On the other hand, as non-silver-halide photographic materials, there are known electrophotographic materials, diazotype photographic materials and free-radical photographic materials and so on. In these materials, however, there is no material which has advantageous characteristics like silver halide photographic material, while being able to simultaneously develop and keep a visible image. Note that, electrophotographic materials have been used mainly in copying machines, since they can perform dry-type development and can simultaneously develop an electrostatic latent image, which is obtained by exposure, using toner.

In such electrophotographic materials, recently, a photographic material has been developed, in which a n optical image c an be electronically and directly recorded and developed as a visible image in no time, the image so developed being similar to one obtained in a silver halide photographic material. A recording medium formed of such a recording material, in which a visible image is electronically and directly recorded and developed, is referred to as an electro-developing recording medium hereinafter.

For example, Japanese Unexamined Patent Publication No. 5-2280 and U.S. Pat. No. 5,424,156 disclose one type of electro-developing recording medium comprising an electrostatic information recording medium and an electric charge keeping medium. The electrostatic information recording medium includes a photoconducting layer and an inorganic oxide material layer, and the electric charge keeping medium includes a liquid crystal display, both the mediums being combined to face each other with a small gap therebetween. In use, a voltage is applied between the electrostatic information recording medium and the electric charge keeping medium, and an optical image is formed on the electrostatic information recording medium during the application of the voltage. An electric charge distribution is produced over the electrostatic information recording medium in accordance with a light intensity distribution of the optical image formed thereon, so that the intensity of an electric field acts on the liquid crystal of the electric charge keeping medium in accordance with the electric charge distribution. Thus, an image derived from the optical image is reproduced in the electric charge keeping medium as a visible image. Namely, as soon as the optical image is formed on the electrostatic information recording medium, the image is developed in the electric charge keeping medium.

When the electric charge keeping medium is constituted as a memory type liquid crystal display, the developed visible image can be kept therein even if the electric field is eliminated from the electro-developing recording medium. In the memory type liquid crystal display, the developed image can be erased by heating it at a given temperature. In this case, the same electro-developing recording medium can be repeatedly used for photographing.

In an electronic still video camera having the electro-developing recording medium, there may be provided an image reader comprising a CCD line sensor for electronically reading image signals from a developed image of the electro-developing recording medium, and the read image signals obtained from the CCD image sensor may be processed in various manners. For example, the read image signals may be stored in a second recording medium such as an IC memory card, a floppy disk, a hard disk or the like. Also, the read image signals may be transferred from the camera to an external processing device such as a computer, a TV monitor and so on.

Also, in such an electronic still video camera, it is desirable that the developed is erased after the read image signals are stored in the second recording medium, so that the same electro-developing recording medium can be repeatedly used for photographing. In this case, the developed image cannot erased from the electro-developing recording medium by an erroneous switching operation of the camera.

On the other hand, when the electronic still video camera is arranged such that a developed image can be thermally erased from the electro-developing recording medium, it is desirable that the thermal erasing mechanism is incorporated in the camera without a bulkiness of the camera.

Furthermore, in the electronic still video camera, when the image signals read from the developed image of the electro-developing recording medium are transferred from the camera to the external device such as a computer, a TV monitor or the like, the transfer of the image signals to the external device should not be executed without establishing a connection between the camera and the external device, so that an electric poser source of the camera can not be wastefully consumed. On the other hand, the electric power source of the camera should be arranged such that the complete transfer of the image signals to the external device can be ensured without interrupting the transfer of the image signals due to a consumption of the power source.

SUMMARY OF THE INVENTION

Therefore, a n object of the present invention is to provide an electronic still video camera having an electro-developing recording medium, and constituted such that an execution of at least two operations can be positively prevented in those modes which are inconsistent with each other.

Another object of the present invention is to provide an electronic still video camera having an electro-developing recording medium, and constituted such that a complete transfer of image signals, read from a developed image of the electro-developing recording medium, to an external device, can be ensured.

Yet another object of the present invention is to provide an electronic still video camera having an electro-developing recording medium, and constituted such that an image-erasing mechanism for thermally erasing a developed image from the electro-developing recording medium can be compactly arranged.

In accordance with a first aspect of the present invention, there is provided an electronic still video camera having an electro-developing recording medium, comprising: photographing means for forming an optical image on the electro-developing recording medium to record and develop the optical image therein; image-sensing means for optically sensing to obtain image data from the developed image of the electro-developing recording medium; and photographing-disabling means for disabling an execution of the formation of the optical image on the electro-developing recording medium during an execution of the sensing of the image data from the developed image of the electro-developing recording medium. In this electronic still video camera, when the photographing means includes photographing-start switch means for carrying out the execution of the formation of the optical image on the electro-developing recording medium, the photographing-start switch means may be disabled by the above-mentioned photographing-disabling means.

Preferably, the electronic still video camera according to the first aspect of the present invention further comprises sensing-disabling means for disabling the execution of the sensing of the image data from the developed image of the electro-developing recording medium during the execution of the formation of the optical image on the electro-developing recording medium. In this case, the image-sensing means includes sensing-start switch means for carrying out the execution of the sensing of the image data from the developed image of the electro-developing recording medium, and the sensing-start switch means is disabled by the sensing-disabling means.

In accordance with a second aspect of the present invention, there is provided an electronic still video camera having an electro-developing recording medium, comprising: photographing means for forming an optical image on the electro-developing recording medium to record and develop the optical image therein; image-sensing means for optically sensing to obtain image data from the developed image of the electro-developing recording medium; photographing-disabling means for disabling the photographing means during an execution of the sensing of the image data from the developed image of the electro-developing recording medium; and sensing-disabling means for disabling an execution of the sensing of the image data from the developed image of the electro-developing recording medium during an execution of the formation of the optical image on the electro-developing recording medium.

Preferably, the electronic still video camera according the second aspect of the present invention further comprises selection means for selecting either the execution of the formation of the optical image on the electro-developing recording medium or the execution of the sensing of the image data from the developed image of the electro-developing recording medium. In this case, the execution of the formation of the optical image on the electro-developing recording medium is disabled by the photographing-disabling means when selecting the execution of the sensing of the image data from the developed image of the electro-developing recording medium by the selection means, and the execution of the sensing of the image data from the developed image of the electro-developing recording medium is disabled by the sensing-disabling means when selecting the execution of the formation of the optical image on the electro-developing recording medium by the selection means. Also, the electronic still video camera may comprise common switch means for carrying out the execution selected by the selection means.

In accordance with a third aspect of the present invention, there is provided an electronic still video camera having an electro-developing recording medium, comprising: photographing means for forming an optical image on the electro-developing recording medium to record and develop the optical image therein; image-sensing means for optically sensing to obtain image data from the developed image of the electro-developing recording medium; image-erasing means for erasing the developed image from the electro-developing recording medium; and image-erasing-disabling means for disabling an execution of the erasing of the developed image from the electro-developing recording medium during either an execution of the formation of the optical image on the electro-developing recording medium or an execution of the sensing of the image data from the developed image of the electro-developing recording medium.

Preferably, the electronic still video camera according to the third aspect of the present invention further comprises selection means for selecting one of three executions: an execution of the formation of the optical image on the electro-developing recording medium; an execution of the sensing of the image data from the developed image of the electro-developing recording medium; and an execution of the erasing the developed image from the electro-developing recording medium. In this case, the execution of the erasing of the developed image from the electro-developing recording medium is disabled by the image-erasing-disabling means when selecting either the execution of the formation of the optical image on the electro-developing recording medium or the execution of the sensing of the image data from the developed image of the electro-developing recording medium by the selection means. The electronic still video camera may comprise common switch means for carrying out the execution selected by the selection means, and the image-erasing means may be associated with the image-sensing means, and is electrically energized only during the execution of the erasing of the developed image from the electro-developing recording medium.

In accordance with a fourth aspect of the present invention, there is provided an electronic still video camera having an electro-developing recording medium, comprising: photographing means for forming an optical image on the electro-developing recording medium to record and develop the optical image therein; image-sensing means for optically sensing to obtain image data from the developed image of the electro-developing recording medium; image-erasing means for erasing the developed image from the electro-developing recording medium; photographing-disabling means for disabling an execution of the formation of the optical image on the electro-developing recording medium during either an execution of the sensing of the image data from the developed image of the electro-developing recording medium or an execution of the erasing of the developed image from the electro-developing recording medium; sensing-disabling means for disabling the execution of the sensing of the image data from the developed image of the electro-developing recording medium during either the execution of the formation of the optical image on the electro-developing recording medium or the execution of the erasing of the developed image from the developed image of the electro-developing recording medium; and image-erasing-disabling means for disabling the execution of the erasing of the developed image from the electro-developing recording medium during either the execution of the formation of the optical image on the electro-developing recording medium or the execution of the sensing of the image data from the developed image of the electro-developing recording medium.

Preferably, the electronic still video camera according to the fourth aspect of the present invention further comprises selection means for selecting one of three executions: an execution of the formation of the optical image on the electro-developing recording medium; an execution of the sensing of the image data from the developed image of the electro-developing recording medium; and an execution of the erasing the developed image from the electro-developing recording medium. In this case, the execution of the formation of the optical image on the electro-developing recording medium is disabled by the photographing-disabling means when selecting either the execution of the sensing of the image data from the developed image of the electro-developing recording medium or the execution of the erasing of the developed image from the electro-developing recording medium by the selection means; the execution of the sensing of the image data from the developed image of the electro-developing recording medium is disabled by the image-sensing-disabling means when selecting either the execution of the formation of the optical image on the electro-developing recording medium or the execution of the sensing of the image data from the developed image of the electro-developing recording medium by the selection means. The electronic still video camera may comprises common switch means for carrying out the execution selected by the selection means, and the image-erasing means may be associated with the image-sensing means, and is electrically energized only during the execution of the erasing of the developed image from the electro-developing recording medium.

In accordance with a fifth aspect of the present invention, there is provided an electronic still video camera having an electro-developing recording medium, comprising: photographing means for forming an optical image on the electro-developing recording medium to record and develop the optical image therein; image-sensing means for optically sensing to obtain image data from the developed image of the electro-developing recording medium, the image-sensing means including a line image sensor for executing the sensing of the image data from the developed image of the electro-developing recording medium by scanning the developed image with the line image sensor; image-erasing means for erasing the developed image from the electro-developing recording medium, the image-erasing means including a linear heater element for executing the erasing of the developed image from the electro-developing recording medium by scanning the developed image with the linear heater element; and moving means for supporting and moving the line image sensor and the linear heater element such that the scanning of the developed image with the line image sensor and the linear heater element can be carried out, the line image sensor being energized only during the execution of the sensing of the image data from the developed image of the electro-developing recording medium, the linear heater element being energized only during the execution of the erasing of the developed image from the electro-developing recording medium.

According to the fifth aspect of the present invention, preferably, the moving means includes a movable member having two leg portions extended such that the electro-developing recording medium is intervened therebetween, and the line image sensor of the image-sensing means is supported by one leg portion of the movable member of the moving means. The image-sensing means further includes a light source supported by the other leg portion of the movable member of the moving means and aligned with the line image sensor, and an optical system supported by the movable member and disposed between the electro-developing recording medium and the line image sensor, and the linear heater element of the image-erasing means is supported by the movable member such that the linear heater element is kept from being projected into an optical path defined between the light source and the line image sensor.

According to the fifth aspect of the present invention, preferably, the light source comprises a plurality of light emitting diodes aligned with each other, and a collimater lens for converting light beams, emitted therefrom, into parallel light beams.

In accordance with a sixth aspect of the present invention, there is provided an electronic still video camera having an electro-developing recording medium, comprising: photographing means for forming an optical image on the electro-developing recording medium to record and develop the optical image therein; image-sensing means for optically sensing to obtain image data from the developed image of the electro-developing recording medium; transferring means for transferring the sensed image data to an external device; detecting means for detecting a connection between the camera and the external device for the transfer of the image data to the external device; and disabling means for disabling an execution of the formation of the optical image on the electro-developing recording medium and/or an execution of the sensing of the image data from the developed image of the electro-developing recording medium when not detecting the connection between the camera and the external device by the detecting means.

According to the sixth aspect of the present invention, preferably, the detecting means includes a terminal having an electric potential, and another terminal grounded, and a movable conductive element for establishing a connection therebetween, and the movable conductive element is moved to and contacted with the terminals when establishing the connection between the camera and the external device.

In accordance with a seventh aspect of the present invention, there is provided an electronic still video camera having an electro-developing recording medium, comprising: photographing means for forming an optical image on the electro-developing recording medium to record and develop the optical image therein; image-sensing means for optically sensing to obtain image data from the developed image of the electro-developing recording medium; transferring means for transferring the sensed image data to an external device; power source means including an internal power source, a detecting circuit for detecting an input or connection of an external power source thereto, and a switching circuit for switching one of the internal power source and the external power source ON to energize the camera; and disabling means for disabling an execution of the formation of the optical image on the electro-developing recording medium and/or an execution of the sensing of the image data from the developed image of the electro-developing recording medium for transferring the image data to the external device, when not detecting the input or connection of the external power source by the detecting circuit.

Preferably, the electronic still video camera according to the seventh aspect of the present invention further comprises image-erasing means for erasing the developed image from the electro-developing recording medium, and the disabling means also disables an execution of the erasing of the developed image from the electro-developing recording medium when not detecting the input or connection of the external power source by the detecting means.

According to the present invention, the image-sensing means may include a movable member, a light source supported by the movable member and disposed on one side of the electro-developing recording medium, a line image sensor supported by the movable member and disposed on another side of the electro-developing recording medium to be aligned with the light source, and an optical system supported by the movable member and disposed between the electro-developing recording medium and the line image sensor, the movable member being intermittently moved at regular intervals in a scanning direction. In this case, the light source may comprises a plurality of light emitting diodes aligned with each other, and a collimater lens for converting light beams, emitted therefrom, into parallel light beams.

Also, according to the present invention, the electro-developing medium may comprises an electrostatic information recording medium and an electric charge keeping medium. The electrostatic information recording medium includes a photoconducting layer and an inorganic oxide material layer, and the electric charge keeping medium includes a liquid crystal display. Preferably, the liquid crystal display comprises a memory type liquid crystal display.

Further, according to the present invention, there may be provided storing means for storing the image data sensed from the developed image of the electro-developing recording medium, and the storing means may comprise a second recording medium such as an IC card, a floppy disk, a hard disk or the like, and a recording device for loading and driving the second recording medium, to thereby store the image data therein.

In the present invention, the electro-developing recording medium comprises an electrostatic information recording medium including a photoconducting layer and an inorganic oxide material layer, and the electric charge keeping medium including a liquid crystal display which preferably comprises a memory type liquid crystal display.

BRIEF DESCRIPTION OF THE DRAWINGS

These objects and other objects of the present invention will be better understood from the following description, with reference to the accompanying drawings in which:

FIG. 11 is a schematic plan view showing an operation mode selection switch 18 provided on a camera body of the electronic still video camera shown in FIG. 9;

FIG. 12 is a schematic plan view showing a scanning mode selection switch provided on the camera body of the electronic still video camera shown in FIG. 9;

FIG. 13 is a table representing relationships between the respective scanning modes designated by the characters [1], [2], [3], [4], and [5]; the respective numbers of horizontal-scanning lines in the modes; and the numbers of pixel signals included in each scanning line obtained in each mode;

DESCRIPTION OF THE PREFERRED EMBODIMENTS

Figure 1:
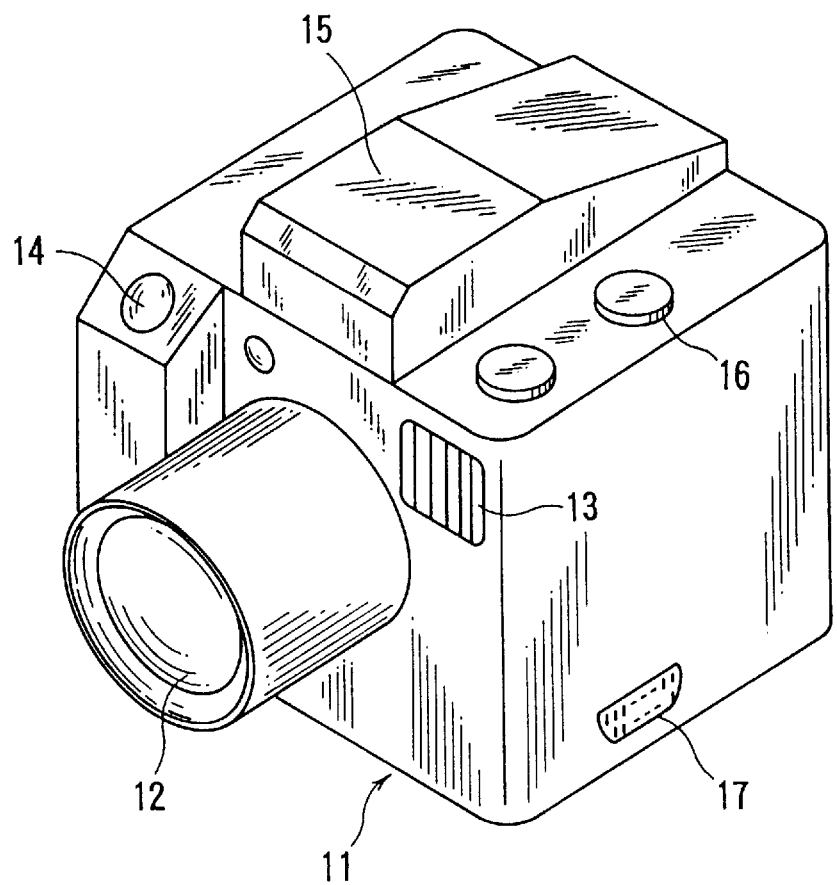
FIG. 1 is a schematic perspective view showing an appearance of a first embodiment of an electronic still video camera according to the present invention.

FIG. 1 is an external view of a first embodiment of an electronic still video camera having an electro-developing recording medium, according to the present invention.

When viewing a camera body 11 from a front side thereof, a photographing optical system 12 including a photographing lens system is provided on approximately a central portion of a front surface of the camera body 11, and an electronic flash 13 is disposed on the front surface of the camera body 11 at a right side of and above the photographing optical system 12. A release switch 14 is provided on the side opposite to the electronic flash 13. On an upper surface of the camera body 11, a view finder 15 is provided at the center portion thereof, and operation switches including a scan start switch 16 are provided on a side of the view finder 15. On a side surface of the camera body 11, an output terminal connector 17 is provided at a lower portion thereof so that an image signal obtained by the camera can be outputted to an external recording device.

Figure 2:
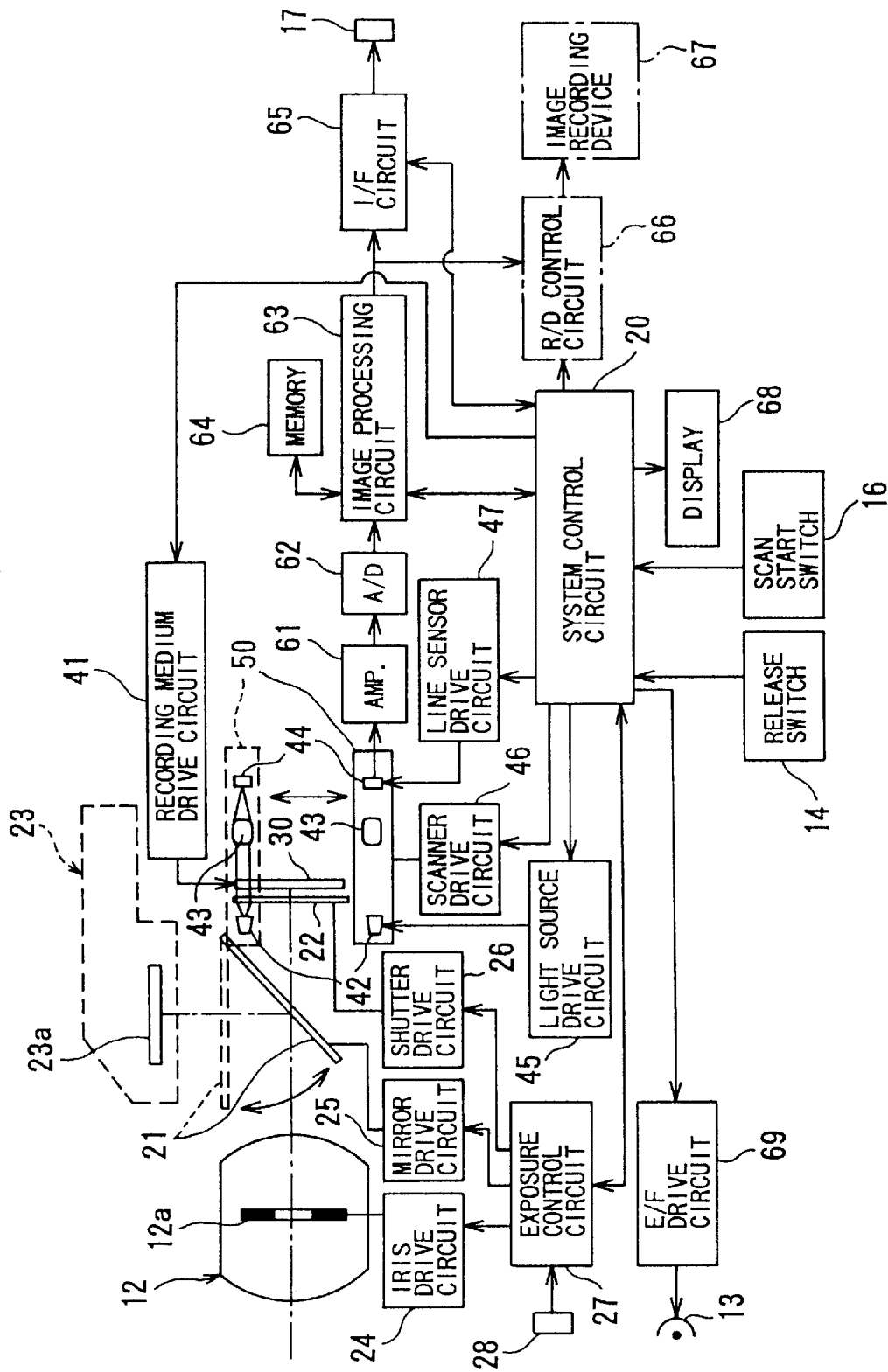
FIG. 2 is a block diagram of the electronic still video camera shown in FIG. 1.

FIG. 2 shows a block diagram of the still video camera as mentioned above, in which a system control circuit 20 including a micro-computer or micro-processor is provided to control the still video camera as a whole.

The photographing optical system 12 has a plurality of lens groups and an aperture 12a. An electro-developing recording medium 30 is disposed behind the photographing optical system 12, and a quick return mirror 21 is placed between the photographing optical system 12 and the electro-developing recording medium 30. A shutter 22 is provided between the quick return mirror 21 and the electro-developing recording medium 30. A focusing glass 23a included in a view finder optical system 23 is disposed above the quick return mirror 21.

The aperture 12a, the quick return mirror 21 and the shutter 22 are driven by an iris drive circuit 24, a mirror drive circuit 25 and a shutter drive circuit 26, respectively. These drive circuits 24, 25 and 26 are controlled by an exposure control circuit 27 which is energized in accordance with a command signal outputted by the system control circuit 20.

While an exposure is controlled, an opening degree of the aperture 12a is adjusted by the iris drive circuit 24 under control of the exposure control circuit 27 based on an output signal of a photometry sensor 28.

The quick return mirror 21 is usually set to a down position (an inclining position shown by the solid line in the drawing), and thus a light beam passing through the photographing optical system 12 is led to the view-finder optical system 23, so that an object to be photographed can be observed by a photographer. When a photographing operation is carried out, the quick return mirror 21 is rotated upward by the mirror drive circuit 25, and is then set to an up position (a horizontal position shown by the broken line in the drawing), so that the light beam is directed to the shutter 22.

The shutter 22 is usually closed, and upon performing a photographing operation, the shutter 22 is opened over a given period of time by the shutter drive circuit 26 under control of the exposure control circuit 27, and thus the light beam passing through the photographing optical system 12 and the shutter 22 is led to a light receiving surface of the electro-developing recording medium 30, resulting in forming a two-dimensional optical image thereon.

A voltage is applied to the electro-developing recording medium 30 under control of a recording medium drive circuit 41. By exposing the electro-developing recording medium 30 while applying the voltage, an image formed by the photographing optical system 12 is developed on the electro-developing recording medium 30 as a visible image. Note that the recording medium drive circuit 41 is energized in accordance with a command signal outputted by the system control circuit 20.

A scanning mechanism 50 is provided close to the electro-developing recording medium 30, and comprises a light source 42 including an LED (light emitting diode) array or a plurality of light emitting diodes aligned with each other, and a collimater lens for converting the light beams, emitted therefrom, into parallel light beams. The scanning mechanism 50 further comprises a scanner optical system 43 and a line sensor 44 supported thereby, and are moved along the electro-developing recording medium 30 during a scanning operation thereof.

The line sensor 44 may comprise a one-dimensional CCD sensor having, for example, 2,000 pixels, and serves as a photoelectric-conversion device for sensing and converting an optical image into electric pixel signals. The line sensor 44 may be of suitable length to completely cover and extended over one horizontal scanning line of the image formed on the electro-developing recording medium 30. The light source 42 can be moved along the front surface of the shutter 22, and therefore, the front surface of the electro-developing recording medium 30 adjacent thereto, and during the movement of the light source 42, the line sensor 44 is moved along the rear surface of the electro-developing recording medium 30.

The scanner optical system 43 is disposed between the light source 42 and the line sensor 44. While the scanning operation is carried out by the scanning mechanism 50, the scanner optical system 43 is placed between the electro-developing recording medium 30 and the line sensor 44. Thus, a liner segment of the image developed by the electro-developing recording medium 30 is illuminated by the light source 42, and is focussed on a light receiving surface of the line sensor 44 by the scanner optical system 43. Namely, the scanner optical system 43 is disposed on the optical path of the parallel light beams passing through the electro-developing recording medium 30, and the line sensor 44 is moved in an imaging plane on which an image is to be formed by the scanner optical system 43.

ON and OFF control of the light source 42 is performed by a light source drive circuit 45. Reading the pixel signals from the line sensor 44 is controlled by a line sensor drive circuit 47. Movement of the scanning mechanism 50 is controlled by a scanner drive circuit 46. The drive circuits 45, 46 and 47 are energized by the system control circuit 20.

The pixel signals sensed and read out of the line sensor 44 are amplified by an amplifier 61, and are then converted to digital pixel signals by an analog-digital (A/D) converter 62. The digital pixel signals are subjected to a shading correction, a gamma correction and so on by an image processing circuit 63 under control of the system control circuit 20, and are then temporarily stored in a memory 64 which may include an EEPROM having correction data for the shading correction. Note, the memory 64 may have a capacity for storing a single-line of digital pixel signals outputted from the line senor 44 or may have a capacity for storing a single-frame of digital pixel signals obtained by a completion of the scanning operation of the scanning mechanism 50.

The pixel signals outputted from the memory 64 may be optionally inputted into an interface circuit 65 through the image process circuit 63. In this case, the pixel signals are subjected to a given processing such as a format-conversion processing and so on, and are then outputted to, for example, an external monitor device (not shown) through the output terminal connector 17. Also, the pixel signals outputted from the image process circuit 63 may be recorded on, for example, a second recording medium, such as an IC memory card, a floppy disk, a detachable hard disk or the like, in an image recording device 67 therefor. In this case, the pixel signals are subjected to a given processing such as an image-compression processing and a format-conversion processing in a recording device control circuit 66. The interface circuit 65 and the recording device control circuit 66 are energized in accordance with a command signal outputted from the system control circuit 20.

The release switch 14 and the scan start switch 16 are connected to the system control circuit 20, and the photographing operation and the scanning operation as mentioned above are executed by turning the switches ON. A display device 68, which may be constituted as an LCD (liquid crystal display) panel, is provided on a rear surface of the camera body 11 at a suitable location thereof, and is connected to system control circuit 20 to display various setting conditions of the still video camera. Also, an electronic flash drive circuit 69 is connected to the system control circuit 20 to control a flashing operation of the electronic flash 13.

Figure 3:
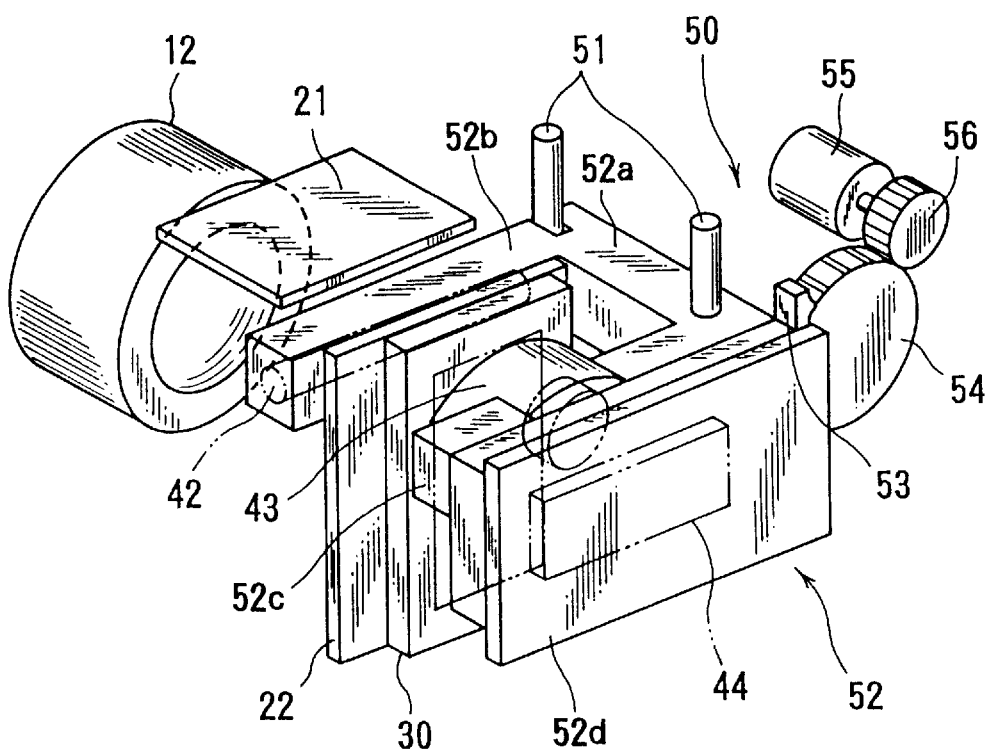
FIG. 3 is a schematic perspective view showing a scanning mechanism used in the electronic still video camera shown in FIGS. 1 and 2.

FIG. 3 shows the structure of the scanning mechanism 50 and elements provided around the mechanism 50.

The scanning mechanism 50 comprises a movable member 52 slidably supported by a pair of guide shafts 51, 51, and the movable member 52 includes a base portion 52*a* slidably engaged with the guide shafts 51, 51, first and second leg portions 52*b* and 52*c* projected from the base portion 52*a*, and a support portion 52*d* securely attached to the second leg portion 52*c*. The first leg portion 52*b* is extended between the quick return mirror 21 and the shutter 22, and the second leg portion 52*c* is extended behind the electro-developing recording medium 30. The support portion 52*d* is provided behind the second leg portion 52*c*. The light source 42, scanner optical system 43, and line sensor 44 are attached to and supported by the first leg portion 52*b*, second leg portion 52*c*, and support portion 52*d*, respectively. The light source 42 and the line sensor 44 are laterally and perpendicularly extended with respect to an optical axis of the photographing optical system 12. The movable member 52 has a rack 53 fixed thereto, and the rack 53 is engaged with a pinion 54 which is meshed with a gear 56 securely mounted on an output shaft of a scan drive motor 55 such as a stepping motor, a When an operation other than the scanning operation for obtaining the pixel signals from the image recorded on the electro-developing recording medium 30 is executed, for example, when the photographing operation is executed, the movable member 52 is removed from the optical path between the photographing optical system 12 and the electro-developing recording medium 30, so as to be positioned below the electro-developing recording medium 30. After a photographing operation is completed so that an image is developed in the electro-developing recording medium 30, the scan drive motor 55 is driven to move the movable member 52 upward from the removal position, whereby the line sensor 44 can execute a scanning operation.

In particular, during the scanning operation, the line sensor 44 is intermittently moved step by step in a direction perpendicular to the longitudinal direction of the line sensor 44.

Figure 4:
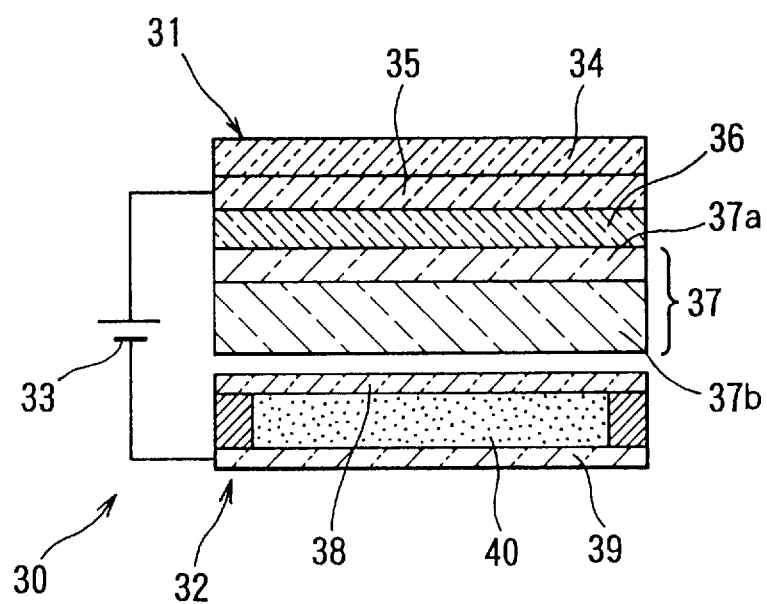
FIG. 4 is a schematic sectional view showing an electro-developing recording medium used in the electronic still video camera shown in FIGS. 1 and 2.

FIG. 4 shows a structure of the electro-developing recording medium 30, which is identical with that disclosed in Japanese Unexamined Patent Publication No. 5-2280 and U.S. Pat. No. 5,424,156, the discloses of which are expressly incorporated herein by reference in their entirety.

The electro-developing recording medium 30 comprises an electrostatic information recording medium 31 and an electric charge keeping medium 32, and a voltage is applied therebetween by an electric power source 33, illustrated symbolically in FIG. 4. The electric power source 33 corresponds to the recording medium drive circuit 41, and a recording medium activating signal (a voltage signal) is applied from the recording medium drive circuit 41 (i.e., the electric power source 33) to the electro-developing recording medium 30 during the photographing operation.

The electrostatic information recording medium 31 is formed by laminating a base plate 34, an electrode layer 35, an inorganic oxide material layer 36 and a photoconducting layer 37, and the photoconducting layer 37 is formed by laminating an electric charge generating layer 37*a* and an electric charge transferring layer 37*b*. The electric charge keeping medium 32 is formed by confining liquid crystal 40 between a liquid crystal supporting plate 38 and a liquid crystal electrode layer 39. The electric charge transferring layer 37*b* of the photoconducting layer 37 and the liquid crystal supporting plate 38 of the electric charge keeping medium 32 face each other with a small gap therebetween. Note, as is apparent from FIG. 4, the whole structure of the electro-developing recording medium 30 is transparent.

When the electric power source 33 is turned ON, or when the recording medium drive circuit 41 is energized, a voltage signal or recording medium activating signal is applied between the electrostatic information recording medium 31 and the electric charge keeping medium 32, i.e., between the electrode layer 35 and the liquid crystal electrode layer 39. When an optical image is formed on the electrostatic information recording medium 31 by the photographing optical system 12 during the application of the voltage signal, an electric charge distribution is produced over the electrostatic information recording medium 31 in accordance with a light intensity distribution of the optical image formed thereon, so that the intensity of an electric field acts on the liquid crystal 40 of the electric charge keeping medium 32 in accordance with the electric charge distribution. Thus, an image derived from the optical image is reproduced in the liquid crystal 40 as a visible image. Namely, as soon as the optical image is formed on the electrostatic information recording medium 31, the image is developed in the electric charge keeping medium 32.

In this embodiment, since the electric charge keeping medium 32 is constituted as a memory type liquid crystal display, the developed visible image can be kept therein even if the electric field is eliminated from the electro-developing recording medium 30. In the memory type liquid crystal display, the developed image can be erased by heating it at a given temperature, using a suitable heater (see, for example, FIG. 16). In this case, the same electro-developing recording medium 30 can be repeatedly used for photographing.

Figure 5:
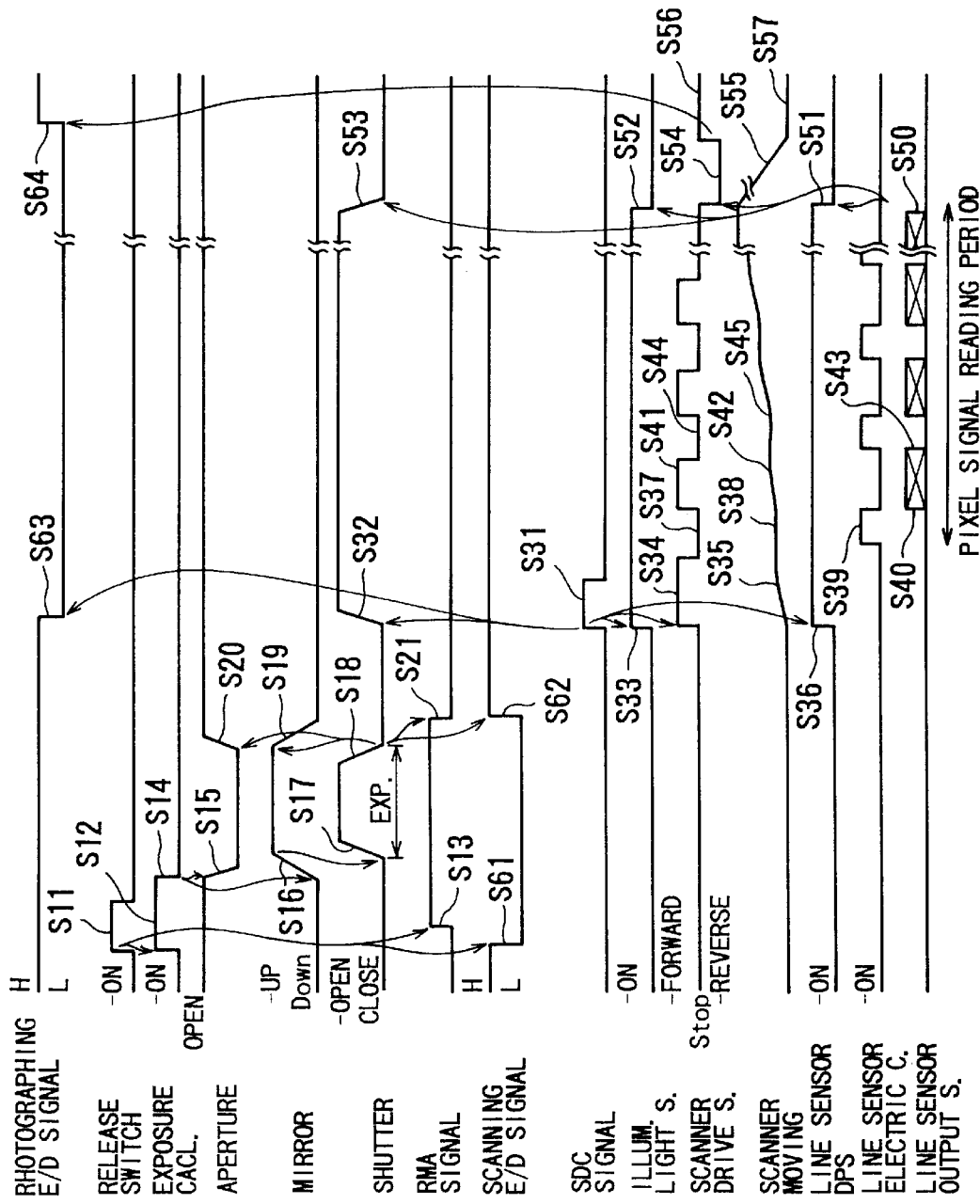
FIG. 5 is a timing chart for explaining a whole operation of the electronic still video camera shown in FIGS. 1 and 2.
Figure 6:
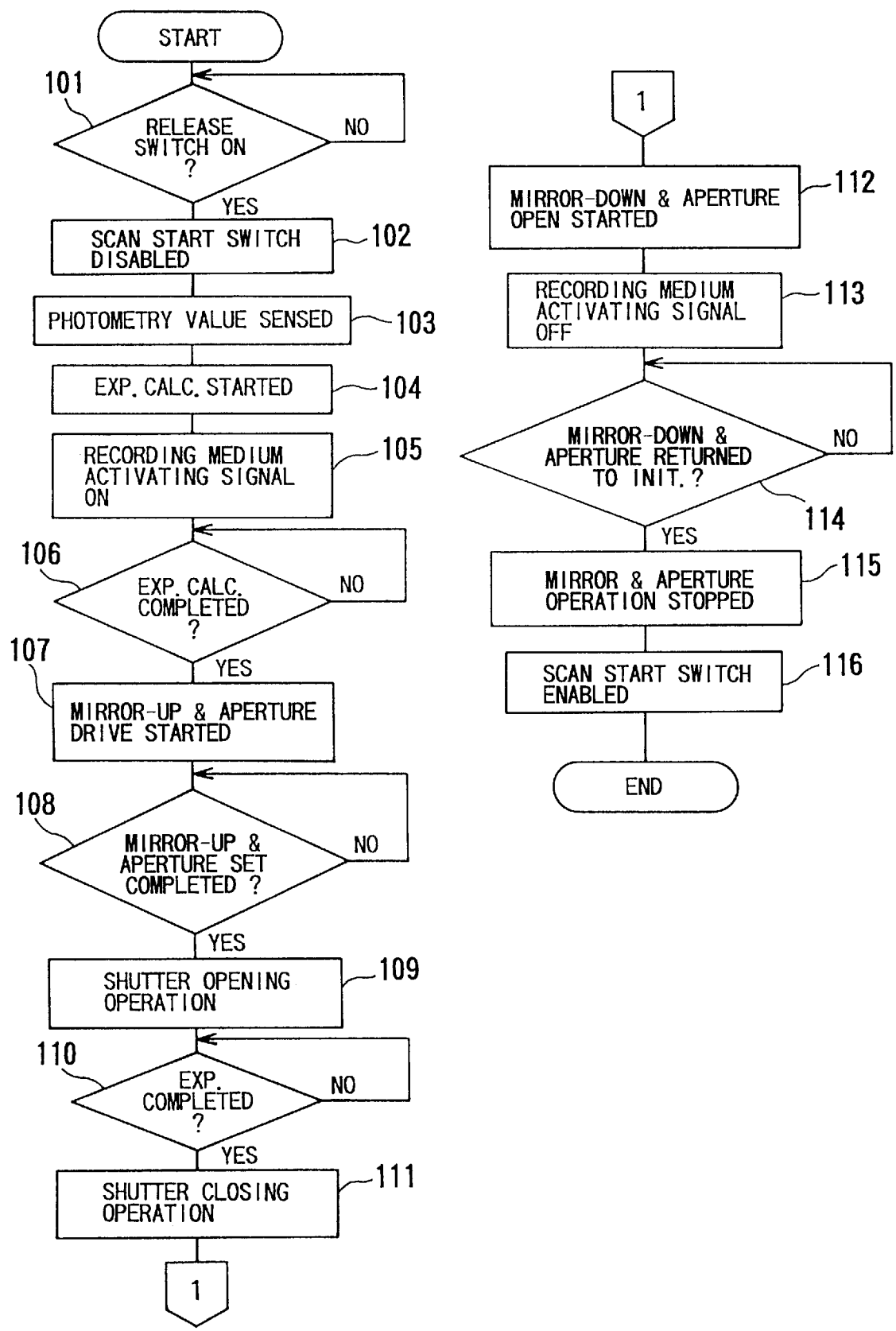
FIG. 6 is a flowchart for explaining a photographing operation of the electronic still video camera shown in FIGS. 1 and 2.

FIG. 5 shows a timing chart for explaining a whole operation of the camera, and FIG. 6 shows a flowchart for explaining a photographing operation of the camera. With reference to these drawings, the photographing operation will be now explained below.

At step 101, it is determined whether or not the release switch 14 has been turned ON. If the turn-ON of the release switch 14 has been carried out, a command signal for executing the photographing operation is made ON (reference "S11" in FIG. 5), and is inputted to the system control circuit 20. Then, at step 102, a scanning operation disabling flag is set to be "1", so that a scanning operation enabling/disabling signal outputted from the system control circuit 20 to the light source drive circuit 45, the scanner drive circuit 46, and the line sensor drive circuit 47 is changed from the high level to the low level (reference "S61" in FIG. 5), whereby the switching operation of the scan start switch 16 is disabled or ignored.

At step 103, an output signal of the photometry sensor 28, i.e., a photometry value, is sensed and fetched by the system control circuit 20, and then the control proceeds to step 104, in which an exposure calculation is started based on the fetched photometry value (reference "S12" in FIG. 5). After a predetermined period of time has elapsed from the ON operation of the release switch 14, the control proceeds to step 105, in which a recording medium activating signal outputted from the recording medium drive circuit 41 to the electro-developing recording medium 30 is made ON (reference "S13" in FIG. 5). Namely, the recording medium activating signal is changed from the low level to the high level, so that the activating voltage is applied between the electrostatic information recording medium 31 and the electric charge keeping medium 32. Then, at step 106, it is determined whether or not the exposure calculation has been completed. When the exposure calculation has been completed (reference "S14" in FIG. 5), the procedures necessary for the photographing operation are subsequently carried out in the following steps on the basis of the calculated result.

At step 107, an opening area of the aperture 12a is adjusted in accordance with the calculated result. Note, since the aperture 12a initially has a fully-open area, the adjustment of the aperture 12a is usually carried out such that the fully-open area thereof is made small (reference "S15"0 in FIG. 5). Also, at step 107, the quick return mirror 21 is changed from the down-position to the up-position (reference "S16" in FIG. 5).

At step 108, it is determined whether or not the quick return mirror 21 has been changed from the down-position to the up-position, and whether or not the adjustment of the aperture 12a has been completed. Then, the control proceeds to step 109, in which the shutter 22 is opened (reference "S17" in FIG. 5), whereby an optical image is focussed and formed on the electro-developing recording medium 30.

At step 110, it is determined whether or not an exposure period of time, which is designated by the calculated result, has elapsed. When the exposure period of time has elapsed, i.e., when the exposure has been completed, the control proceeds to step 111, in which the shutter 22 is closed (reference "S18" in FIG. 5). After the closing of the shutter 22 is completed, the control proceeds to step 112, in which the quick return mirror 21 is returned from the up-position to the down-position (reference "S19" in FIG. 5), and in which the opening area of the aperture 12a is returned to the fully-open area (reference "S20" in FIG. 5). Then, at step 113, the output voltage of the recording medium activating signal is made OFF (reference "S21" in FIG. 5), i.e., the recording medium activating signal is returned from the high level to the low level.

Namely, the output of the recording medium activating signal to the electro-developing recording medium 30 is at least kept on during the period of time during which the shutter 22 is opened, whereby recording and development of the optical image can be carried out in the electro-developing recording medium 30. As mentioned above, the electric charge keeping medium 32 of the electro-developing recording medium 30 is constituted as a memory type liquid crystal display, and thus the developed image can be held therein even if the output of the recording medium activating signal is stopped.

At step 114, it is determined whether or not the quick return mirror 21 has moved to the initial position or down-position, and whether or not the opening area of the aperture 12a has returned to the initial area or fully-open area. Then, the control proceeds to step 115, in which the driving of the quick return mirror 21 and the aperture 12a are stopped. Subsequently, at step 116, the scanning operation disabling flag is reset to be "0", so that the scanning operation enabling/disabling signal outputted from the system control circuit 20 to the light source drive circuit 45, the scanner drive circuit 46, and the line sensor drive circuit 47 is changed from the low level to the high level (reference "S62" in FIG. 5), whereby the switching operation of the scan start switch 16 is enabled, and thus the routine represented by the flowchart of FIG. 6 is ended.

In the operation as mentioned above, the recording medium activating signal may be outputted just before the exposure is started, i.e., just before the shutter 22 is opened, if necessary. In this case, in the flow chart of FIG. 6, step 105 is positioned between steps 108 and 109.

As is apparent from the above-mentioned description of the photographing operation, as soon as the release switch 14 is turned ON, the scan start switch 16 is disabled. Accordingly, although the scan start switch 16 may be erroneously turned ON during the photographing operation, the scanning mechanism 50 for executing a scanning operation cannot be operationally actuated.

Figure 7:
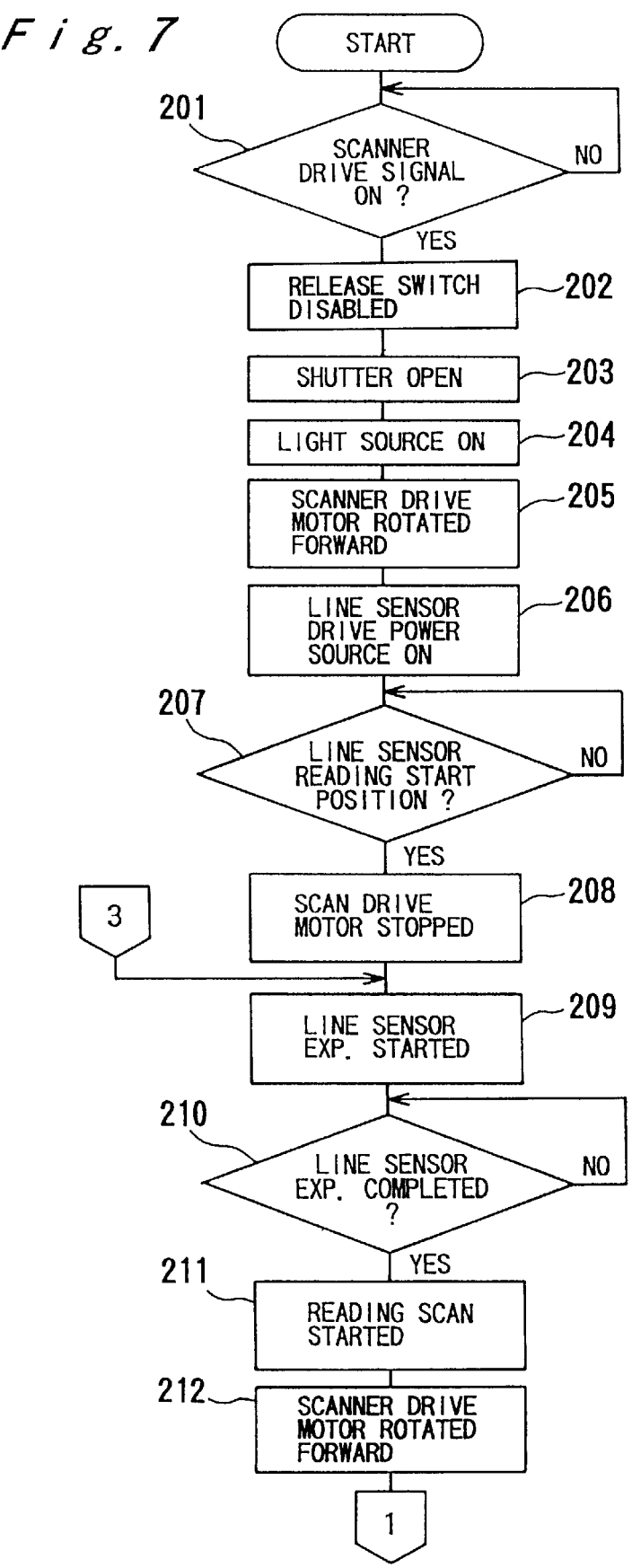
FIG. 7 is a part of a flowchart for explaining a scanning operation of the electronic still video camera shown in FIGS. 1 and 2.
Figure 8:
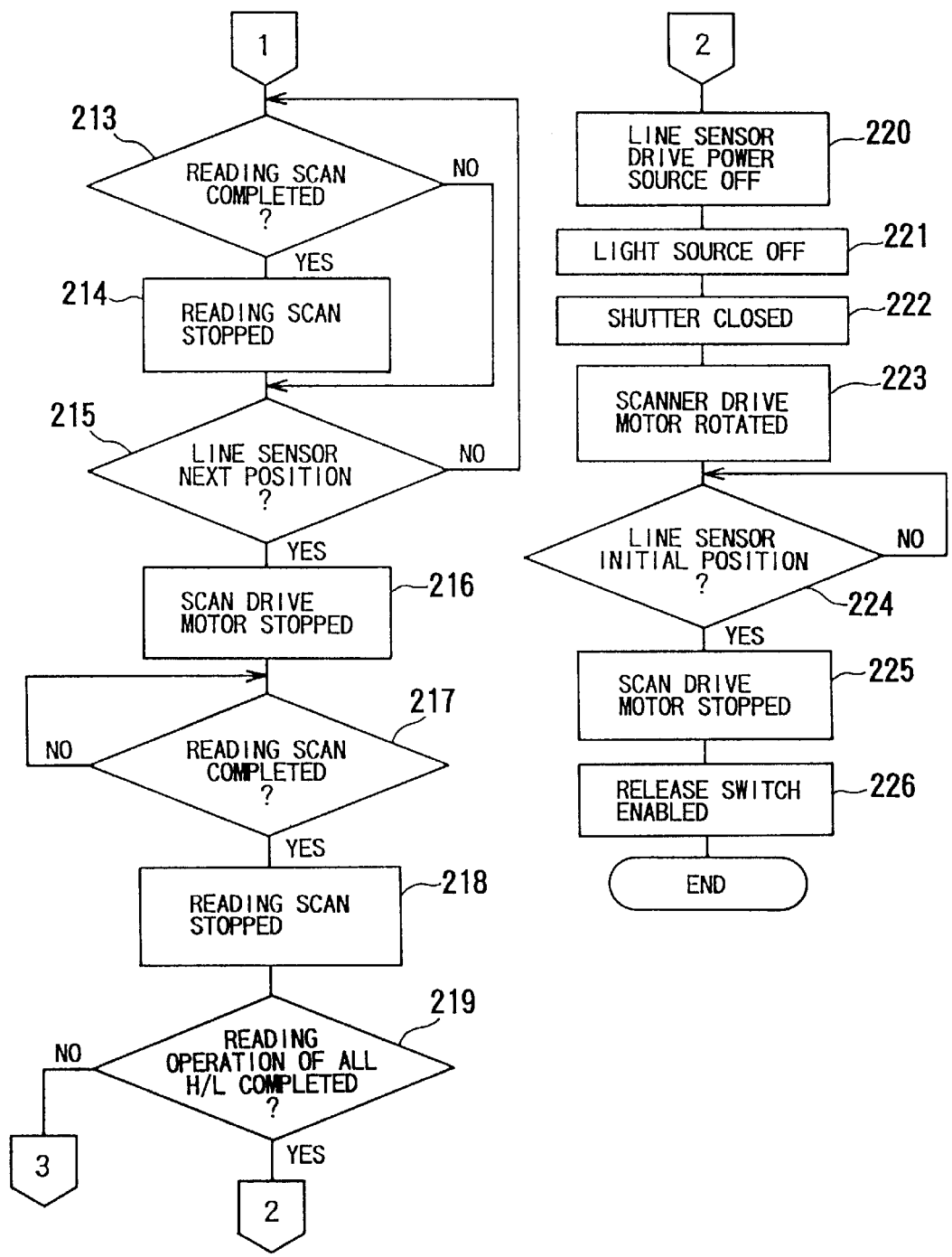
FIG. 8 is the other part of the flowchart for explaining a scanning operation of the electronic still video camera shown in FIGS. 1 and 2.

FIGS. 7 and 8 show a flowchart for explaining a scanning operation for optically sensing and reading the developed image held in the electro-developing recording medium 30. With reference to FIG. 5, and FIGS. 7 and 8, the scanning operation will be now explained below.

At step 201, it is determined whether or not the scan start switch 16 has been made ON. If the turn-ON of the scan start switch 16 has been carried out, a scanner drive command signal for executing the scanning operation is made ON (reference "S31" in FIG. 5), and is inputted to the system control circuit. Then, at step 202, a photographing operation disabling flag is set to be "1", so that a photographing operation enabling/disabling signal outputted from the system control circuit 20 to the exposure control circuit 27 is changed from the high level to the low level (reference "S63" in FIG. 5), whereby the switching operation of the release switch 14 is disabled or ignored.

At step 203, the shutter 22 is opened (reference "S32" in FIG. 5), and the control proceeds to step 204, in which the light source 42 is made ON (reference "S33" in FIG. 5). Then, at step 205, a scanner drive signal outputted from the system control circuit 20 to the scanner drive circuit 46 is changed from the zero level to the positive level (reference "S34" in FIG. 5), so that the scan drive motor 55 is driven in a forward direction due to the drive pulses outputted from the scanner drive circuit 46 thereto, whereby the movable member 52 of the scanning mechanism 50 starts to move upward from the removal position toward an image-reading start position (reference "S35" in FIG. 5). Subsequently, at step 206, a line sensor drive power source included in the line sensor drive circuit 47 is made ON (reference "S36" in FIG. 5).

At step 207, it is determined whether or not the line sensor 44 supported by the movable member 52 has been moved to an image-reading start position. When the line sensor 44 reaches the image-reading start position, the control proceeds to step 208, in which the scanner drive signal outputted from the system control circuit 20 to the scanner drive circuit 46 is returned from the positive level to the zero level (reference "S37" in FIG. 5), and thus the output of the drive pulses from the scanner drive circuit 46 to the scan drive motor 55 is interrupted to thereby stop the scan drive motor 55 (reference "S38" in FIG. 5), whereby the line sensor 44 is held at the image-reading start position. Note, the standing still of the line sensor 44 at the image-reading start position may be controlled by, for example, counting the driving pulses outputted from the scanner drive circuit 46 to the scan drive motor 55.

At step 209, an exposure of the line sensor 44 is started by the illumination of the light source 42, and thus electric charge accumulation in the line sensor 44 is performed (reference "S39" in FIG. 5). Then, at step 210, it is determined whether or not a given time has elapsed or the electric charge accumulation in the line sensor 44 has been completed. When the electric charge accumulation in the line sensor 44 is completed, the control proceeds to step 211, in which a reading-scan of pixel signals from the line sensor 44, (i.e., a first horizontal-scanning line) is started by the line sensor drive circuit (reference "S40" in FIG. 5).

At step 212, the scanner drive signal outputted from the system control circuit 20 to the scanner drive circuit 46 is changed from the zero level to the positive level (reference "S41" in FIG. 5), so that the scan drive motor 55 is driven in the forward direction due to the drive pulses outputted from the scanner drive circuit 46 thereto, whereby the movable member 52, and therefore, the line sensor 44 is moved upward (reference "S42" in FIG. 5).

During the movement of the line sensor 44, it is determined at step 213 whether or not the reading-scan of pixel signals from the line sensor 44 has been completed. If the completion of the reading-scan is confirmed, the control proceeds to step 214, in which the reading-scan of pixel signals from the line sensor 44 is stopped (reference "S43" in FIG. 5). Note that the completion of the reading-scan can be known by, for example, counting reading-clock pulses outputted from the line sensor drive circuit 47 to drive the line sensor 44.

At step 213, if the completion of the reading-scan is not confirmed, the control skips over step 214, and then the control proceeds to step 215, in which it is determined whether or not the line sensor 44 has been moved to a next image-reading position (corresponding to a position at which the pixel signals included in a subsequent horizontal scanning line are read). If the line sensor 44 has not reached the next image-reading position, the control returns to step 213, and the routine including steps 213, 214, and 215 is repeated until the line sensor 44 reaches the next image-reading position.

At step 213, if the completion of the reading-scan is confirmed, the control proceeds to step 214, in which the reading-scan of pixel signals from the line sensor 44 is stopped. Then, the control proceeds to step 215.

At step 215, when it is confirmed that the line sensor 44 has reached the next image-reading position, the control proceeds from step 215 to step 216, in which the scanner drive signal outputted from the system control circuit 20 to the scanner drive circuit 46 is returned from the positive level to the zero level (reference "S44" in FIG. 5), and thus the output of the drive pulses from the scanner drive circuit 46 to the scan drive motor 55 is interrupted to thereby stop the scan drive motor 55 (reference "S45" in FIG. 5), whereby the line sensor 44 is held at the next image-reading position. Similarly, the standing still of the line sensor 44 at the next image-reading position can be controlled by counting the driving pulses outputted from the scanner drive circuit 46 to the scan drive motor 55.

Then, at step 217, it is again determined whether or not the reading-scan of the single-line of pixel signals from the line sensor 44 has been completed. This is because the control may proceed from step 215 to step 216 without having any access to step 214, i.e., because there may be a case where the reading-scan of the pixel signals from the line sensor 44 is not yet completed even after the line sensor 44 reaches the next image-reading position. When the completion of the reading-scan is confirmed at step 217, the control proceeds to step 218, in which the operation for the reading-scan is stopped.

At step 219, it is determined whether or not the whole of the developed image has been completely read, i.e., the reading-scans have been completed on all of the horizontal-scanning lines defined by intervals of the intermittent movements of the line sensor 44. This determination is made possible by, for example, counting the drive pulses outputted from the scanner drive circuit 46. If the whole of the developed image has not been completely read, the control returns to step 209. Namely, the routine including steps 209 to 219 is repeated until the reading-scans are completed on all of the horizontal-scanning lines. Note, in this first embodiment, all of the horizontal-scanning lines may be a number of about 2,000.

At step 219, when the whole of the developed image has not been completely read (reference "S50" in FIG. 5), the control proceeds to step 220, in which the line sensor drive power source included in the line sensor drive circuit 47 is made OFF (reference "51" in FIG. 5). Then, at step 221, the light source 42 is made OFF (reference "S52" in FIG. 5), and at step 222, the shutter 22 is closed (reference "S53" in FIG. 5). Subsequently, at step 223, the scanner drive signal outputted from the system control circuit 20 to the scanner drive circuit 46 is changed from the zero level to the negative level (reference "S54" in FIG. 5), so that the scan drive motor 55 is driven in a reverse direction due to the drive pulses outputted from the scanner drive circuit 46 thereto, whereby the movable member 52 (the line sensor 44) of the scanning mechanism 50 starts to move downward toward the removal or initial position (reference "S55" in FIG. 5).

At step 224, it is determined whether or not the line sensor 44 has been moved to the initial position away from the electro-developing recording medium 30. When the line sensor 44 reaches the initial position, the control proceeds to step 225, in which the scanner drive signal outputted from the system control circuit 20 to the scanner drive circuit 46 is returned from the negative level to the zero level (reference "S56" in FIG. 5), and thus the output of the drive pulses from the scanner drive circuit 46 to the scan drive motor 55 is stopped, i.e., the scan drive motor 55 is stopped (reference "S57" in FIG. 5), whereby the line sensor 44 is held at the initial or removal position thereof. The standing still of the line sensor 44 at the initial position may be known by detecting a part of the movable member 52 with, for example, a photo-interrupter type detector (not shown).

At step 226, the photographing operation disabling flag is reset to be "0", so that a photographing operation enabling/ disabling signal outputted from the system control circuit 20 to the exposure control circuit 27 is changed from the low level to the high level (reference "S64" in FIG. 5), whereby the switching operation of the release switch 14 is enabled. Thus, the routine of FIGS. 7 and 8 is ended.

As is apparent from the above-mentioned description of the scanning operation, as soon as the scan start switch 16 has been turned ON, the release switch 14 is disabled. Accordingly, although the release switch 14 may be erroneously turned ON during the scanning operation, a photographing operation will not be carried out.

Figure 9:
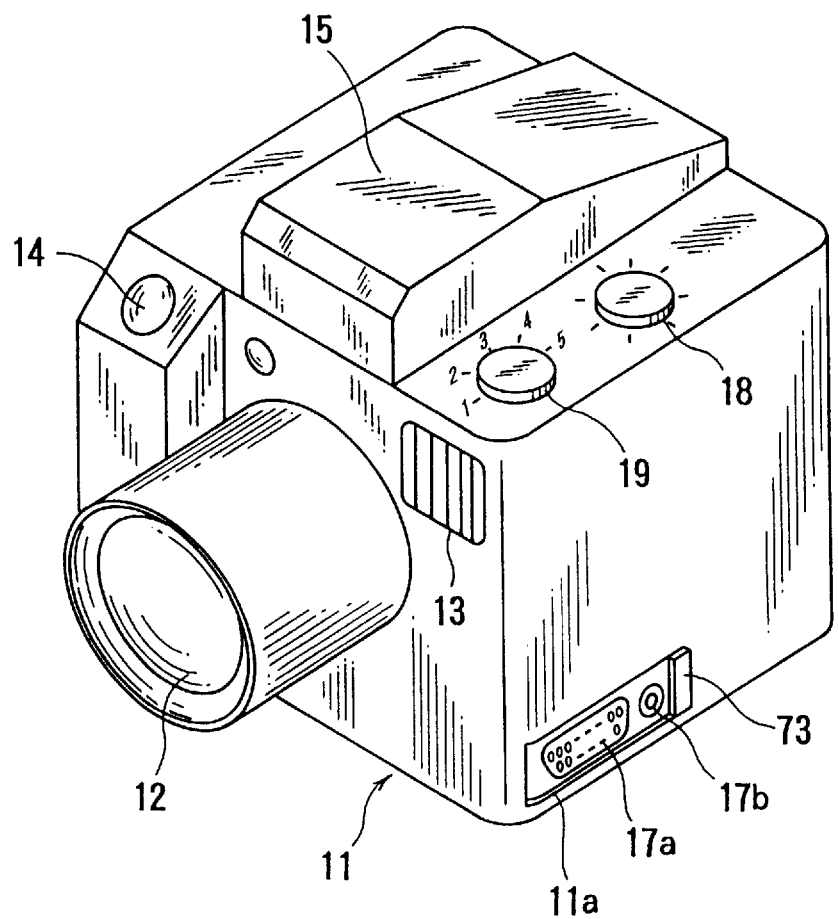
FIG. 9 is a schematic perspective view showing an appearance of a second embodiment of an electronic still video camera according to the present invention.

FIG. 9 shows a second embodiment of a still video camera according to the present invention. In this drawing, the same references as in FIG. 1 represent the same elements. Note, the same electro-developing recording medium 30 as shown in FIG. 4 may be used in the second embodiment.

In the second embodiment, the scan start switch 16 (FIG. 1) is eliminated from the camera body 11, and an operation mode selection switch 18 is provided at the same place as the scan start switch 16. The operation mode selection switch 18 is constituted as a rotary type switch, and one of seven operation modes is selected by manually turning the operation mode selection switch 18. Also, a scanning mode selection switch 19 is provided adjacent to the operation mode selection switch 18, and is also constituted as a rotary type switch. One of five scanning modes is selected by manually turning the scanning mode selection switch 19. Note, these mode selection switches 18 and 19 will be explained in detail hereinafter, with reference to FIGS. 11, 12, and 13.

As shown in FIG. 9, in the second embodiment, the output-terminal connector for outputting image signals to an external recording device such as a personal computer is designated by reference 17a, and is provided within an opening 11a formed in the side wall of the camera body 11. Also, another output-terminal connector 17b is provided within the opening 11a adjacent to the output-terminal connector 17a, and is used to directly output video signals to an external monitor device. The opening 11a is usually closed by a slidable cover plate 73 provided within the camera body 11, whereby the output-terminal connectors 17a and 17b can be protected by the slidable cover plate 73. The slidable cover plate 73 is manually moved between a closed position and an open position, and is shown at the open position in FIG. 9. The slidable cover plate 73 can be held at each of the closed and open positions by a suitable click mechanism (not shown).

Figure 10:
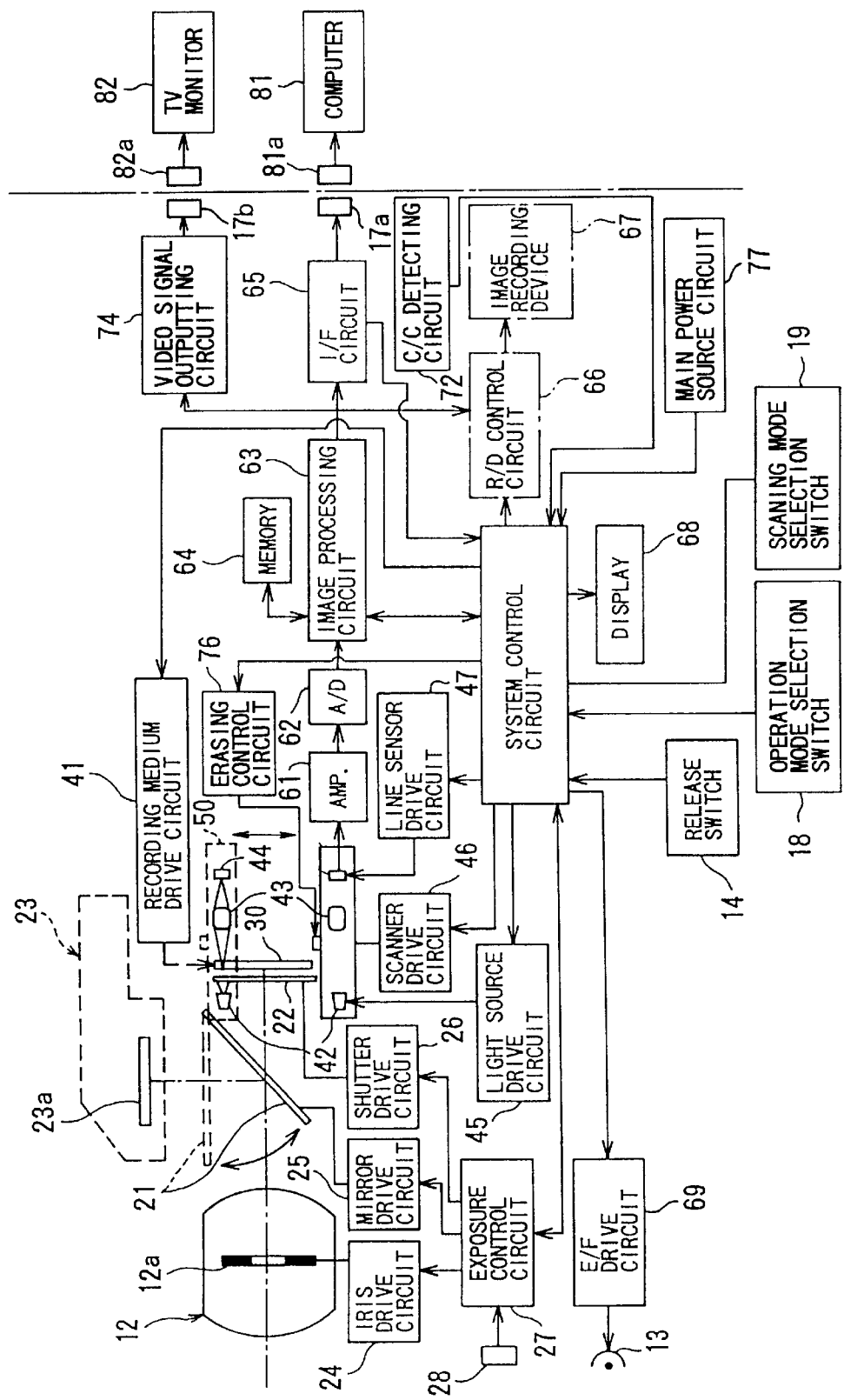
FIG. 10 is a block diagram of the electronic still video camera shown in FIG. 9.

FIG. 10 shows a block diagram of the still video camera shown in FIG. 9. In this drawing, the same references as in FIG. 2 represent the same elements.

In the second embodiment, the output-terminal connector 17a can be connected to an interface connector 81a joined to an end of a cable extended from a personal computer 81, and the pixel signals subjected to the processing as mentioned above are outputted from the interface circuit 65 to the computer 81 through the connectors 17a and 81a, and the cable extended therefrom. The image signals may be processed in various manners by the computer 81, and may be then reproduced on a monitor (not shown) associated therewith.

The output-terminal connector 17b can be connected to an interface connector 82a joined to an end of a cable extended from a TV monitor 82 such as a liquid crystal type TV monitor. On the other hand, the output-terminal connector 17b is connected to a video-signal outputting circuit 74, which is then connected to the recording device control circuit 66. Namely, the video-signal outputting circuit 74 receives the pixel signals processed by the recording device control circuit 66, and processes the received pixel signals to thereby produce video signals, so that an image can be reproduced on the TV monitor 82 on the basis of the video signals.

As shown in FIG. 10, in the second embodiment, a thermal erasing device 75 is provided to thermally erase an image recorded in the electro-developing recording medium 30 therefrom, and is incorporated in the scanning mechanism 50. The thermal erasing device 75 is controlled by an erasing control circuit 76 which is energized in accordance with a command signal outputted from the system control circuit 20. Note, the thermal erasing device 75 will be explained in detail hereinafter, with reference to FIG. 14, 15, and 16.

Also, in the second embodiment, a connector-connection detecting circuit 72 is provided to detect a connection of the respective cable connectors 81a and/or 82a to the connectors 17a and/or 17b. Note, the connector-connection detecting circuit 72 will be explained in detail hereinafter, with reference to FIGS. 17 to 21.

Furthermore, in the second embodiment, a main power source circuit 77 is provided to detect an output voltage level of an internal battery (not shown in FIG. 10) proved in the camera body 11, and an input or connection of an external power source (not shown) such as an AC power adaptor, a detachable additional battery power pack or the like. Note, the main power source circuit 77 will be explained in detail hereinafter, with reference to FIG. 20.

The operation mode selection switch 18 is connected to the system control circuit 20, as shown in FIG. 10, and inputs various commands thereto for making the camera execute various operations by merely depressing and turning the release switch 14 ON. As shown in FIG. 11, seven indication marks are made around the operation mode selection switch 18 on the surface of the camera body 11, and are distinguished from each other by significant characters AP, MP, AV, MV, IR, EO, and IE affixed thereto, respectively. The significant characters AP, MP, AV, MV, IR, EO, and IE mean an auto-photographing/recording mode (AP), a manual-photographing mode (MP), an auto-video-monitor mode (AV), a manual-video-monitor mode (MV), an image-recording mode (IR), an externally-outputting mode (EO), and an image-erasing mode (IE), respectively. The operation mode selection switch 18 has an indicating protrusion 18a projected therefrom, and one of the seven operation modes is selected by matching the indicating protrusion 18a with the indication mark concerned. Whenever one of the operation modes is selected by the operation mode selection switch 18, the camera executes an operation in the selected mode when the release switch 14 is depressed and turned ON. Namely, only one of the operation modes is selected by the rotary type selection switch 18, and the camera carries out only an execution of the operation in the selected mode by the turn-ON of the release switch 14.

The scanning mode selection switch 19 is also connected to the system control circuit 20, and inputs various commands thereto for executing a scanning operation in various modes. As shown in FIG. 12, five indication marks are made around the scanning mode selection switch 19 on the surface of the camera body 11, and are distinguished from each other by numerical characters [1], [2], [3], [4], and [5] affixed thereto, respectively. The scanning mode selection switch 19 has an indicating protrusion 19a projected therefrom, and one of the five scanning modes is selected by matching the indicating protrusion 19a with the indication mark concerned. When one of the scanning modes is selected by the scanning mode selection switch 19, the scanning operation is carried out in the selected mode in which a given number of the horizontal-scanning lines is defined, with each of the scanning lines including a given number of pixel signals.

FIG. 13 shows a table representing the relationships between the respective modes designated by the numerical characters [1], [2], [3], [4], and [5]; the respective numbers of the horizontal-scanning lines in the modes; and the numbers of the pixel signals included in each scanning line obtained in each mode. Note, in this table, "X" designates a number of pixel signals included in a horizontal-scanning line; and "Y" designates a number of horizontal-scanning lines (i.e., a total number of steps of the line sensor 44 necessary for scanning the image area of the medium 30 therewith). As is apparent from this table, when the indicating protrusion 19a of the scanning mode selection switch 19 is matched, for example, with the indication mark [5] (i.e., when the scanning mode [5] is selected), the scanning operation is carried out by the line sensor 44 such that the horizontal-scanning lines of 3,072 can be obtained. In this case, all of the pixel signals (4,096) are sampled from the line sensor 44 having 4,096 pixels. Also, when the scanning mode [4] is selected, the horizontal-scanning lines of 2,048 can be obtained, and the pixel signals of 3,072 are subsampled from the line sensor 44. Similarly, in the scanning mode [3], a number of the horizontal-scanning lines are 1024, and the pixel signals of 1,536 are subsampled from the line sensor 44; in the scanning mode [2], a number of the horizontal-scanning lines are 512, and the pixel signals of 762 are subsampled from the line sensor 44; and in the scanning mode [1], a number of the horizontal-scanning lines are 480, and the pixel signals of 640 are subsampled from the line sensor 44.

Accordingly, the scanning mode [5] should be selected before a developed image can be read, with the highest resolution, from the electro-developing recording medium 30 by the line sensor 44. Nevertheless, in the scanning mode [5], the reading of the developed image from the electro-developing recording medium 30 is very slow. On the other hand, in the scanning mode [1], a reading of the developed image from the electro-developing recording medium 30 is very fast, but a resolution of the read image is lowest. Thus, one of the scanning modes [1], [2], [3], [4], and [5] can be suitably selected by a user in accordance with a compromise between a resolution of the read image and a speed of the reading. Note, since the scanning mode [1] is suitable for reproduction of the image on the TV monitor 82, this mode is necessarily selected when performing the reproduction of the image on the TV monitor 82.

Figure 14:
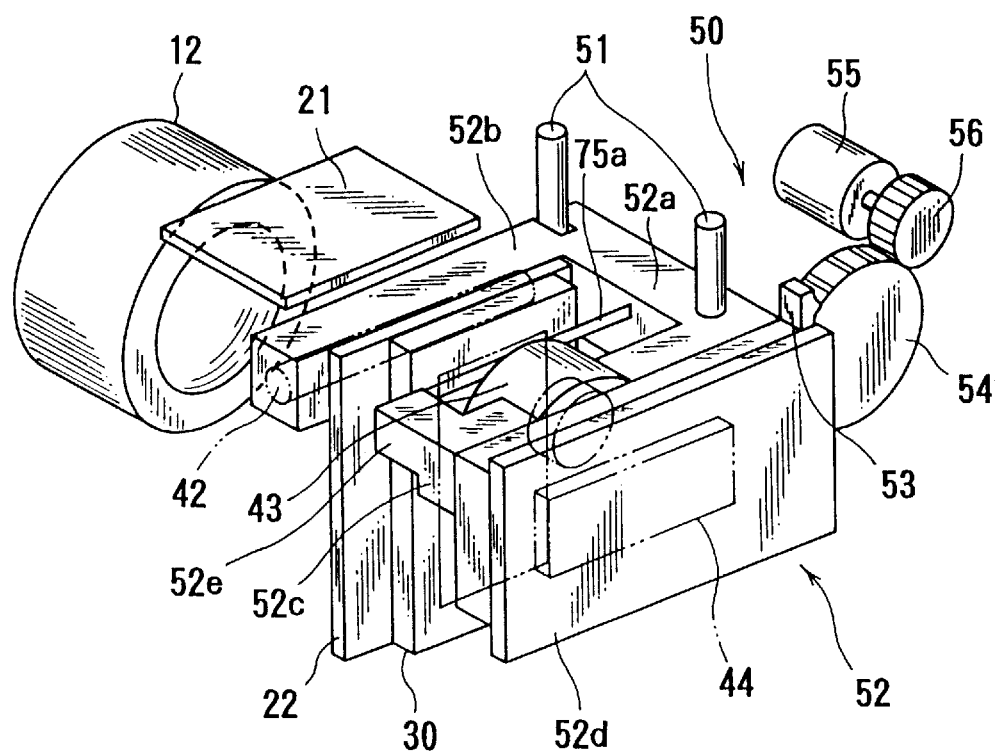
FIG. 14 is a schematic perspective view showing a scanning mechanism used in the electronic still video camera shown in FIGS. 9 and 10.
Figure 15:
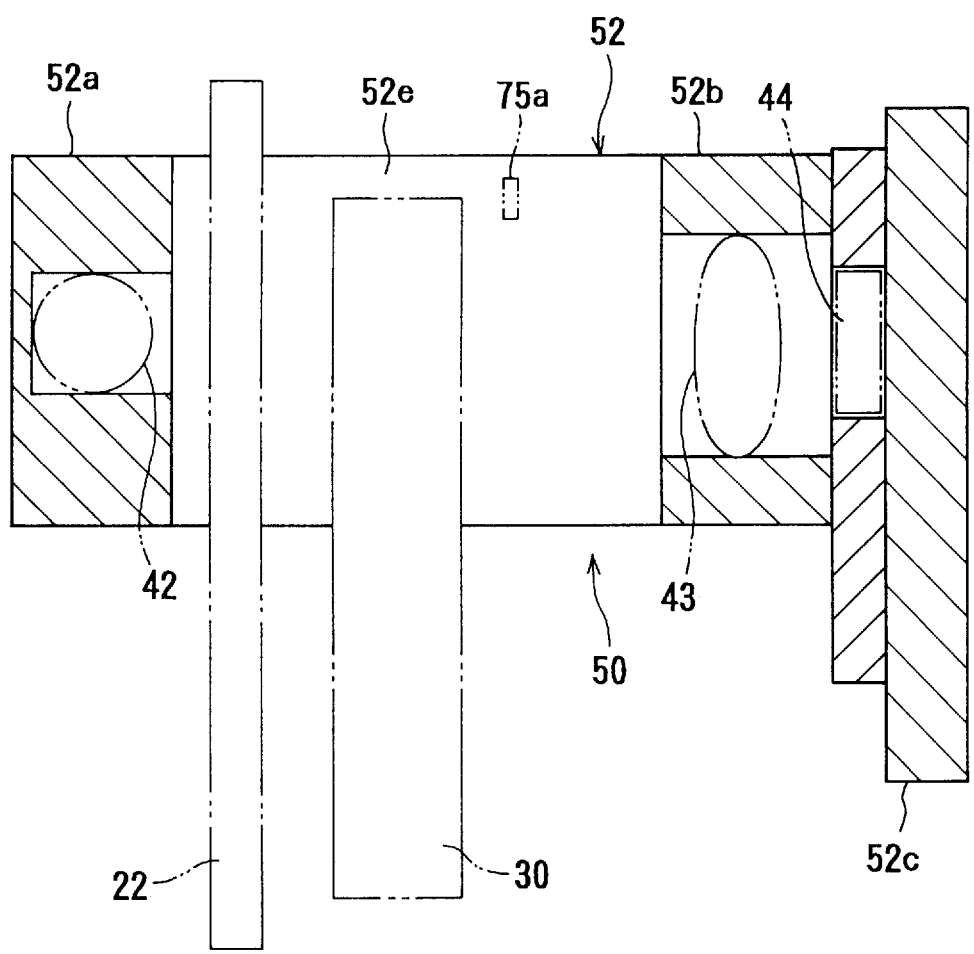
FIG. 15 is a schematic longitudinal-sectional view of the scanning mechanism shown in FIG. 14.

FIGS. 14 and 15 show a structure of the scanning mechanism 50 used in the second embodiment, and elements provided around this mechanism 50. The scanning mechanism 50 used in the second embodiment is identical with that shown in FIG. 3 except that the thermal erasing device 75 is incorporated therein. Note, in FIGS. 14 and 15, the same references as in FIG. 3 represent the same elements.

The thermal erasing device 75 (FIG. 10) includes an electric heater element 75a as a main element thereof, and this electric heater element 75a is supported by the movable member 52. In particular, as shown in FIG. 14, the second leg portion 52c of the movable member 52 has a protrusion 52e projected from the free end of the second leg portion 52c, and the electric heater element 75a is extended between and supported by the base portion 52a of the movable member 52 and the protrusion 42e. As best shown in FIG. 15, the electric heater element 75a is positioned so as to not project into an optical path defined between the light source 42 and the line sensor 44, whereby the scan-reading carried out by the line sensor 44 cannot be interfered with by the electric heater element 75a.

Figure 16:
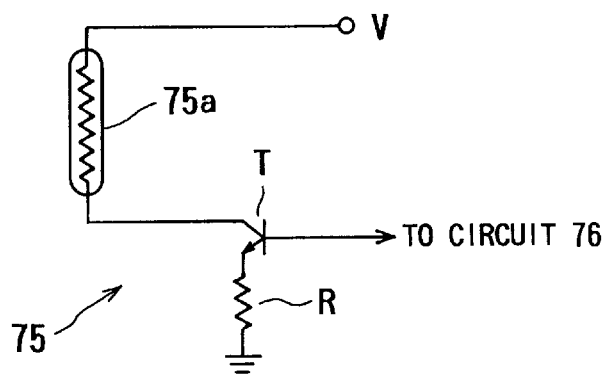
FIG. 16 is an electric circuit of a thermal erasing device shown in FIG. 10.

FIG. 16 shows an electric circuit of the thermal erasing device 75. As shown in this drawing, the electric heater element 75a is connected to an electric power source, symbolically designated by "V", at one end thereof. The other end of the electric heater element 75a is grounded through the intermediary of a transistor switch "T" and a resistance "R". When an ON and OFF signal outputted from the erasing control circuit 76 to the transistor switch "T" is changed from the low level into the high level, the transistor switch "T" is made ON, so that an electric current flows from the source to the ground, and thus the electric heater element 75a is electrically heated, whereby thermal radiation is emitted from the electric heater element 75a. In an erasing operation, the movable member 50 is moved along the surface of the electro-developing recording medium 30 holding an image recorded therein, and thus the electro-developing recording medium 30 is subjected to the thermal radiation emitted from the electric heater element 75a, whereby the image can be thermally erased from the electro-developing recording medium 30.

Figure 17:
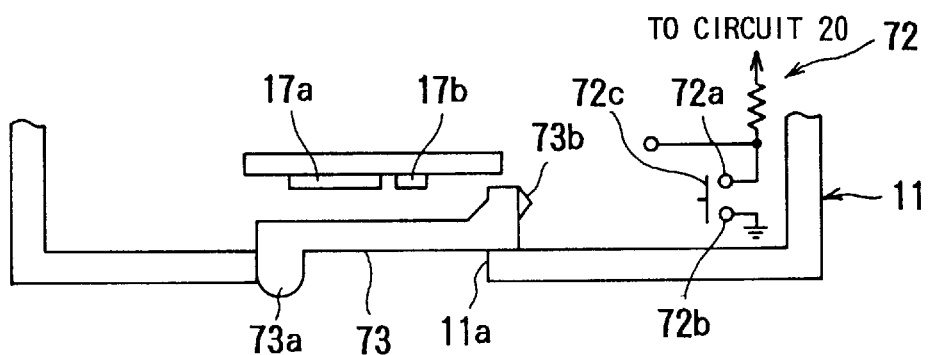
FIG. 17 is a schematic view showing an embodiment of a connector-connection detecting circuit together with output terminal connectors associated therewith and provided in the camera body of the electronic still video camera shown in FIG. 9.
Figure 18:
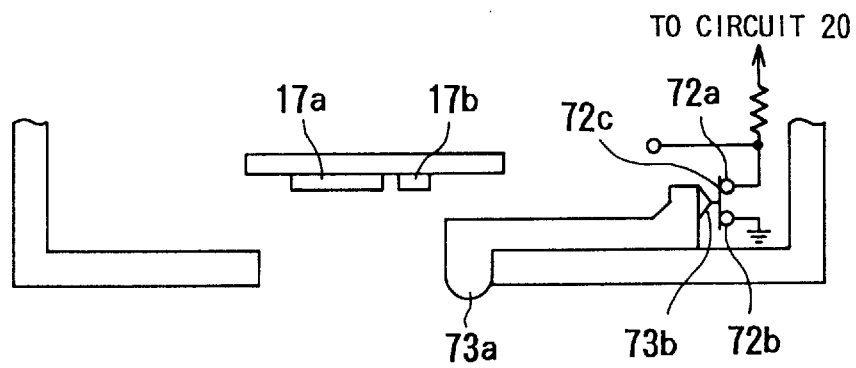
FIG. 18 is a schematic view similar to FIG. 17, showing a part of the elements at different positions.

FIGS. 17 and 18 schematically show an embodiment of the connector-connection detecting circuit 72 constituted such that the connection of the cable connectors 81a and/or 82a to the connectors 17a and/or 17b is indirectly detected. As illustrated, the connector-connection detecting circuit 72 is associated with the slidable cover plate 73, and includes a terminal 72a having a suitable electric potential applied thereto, a terminal 72b grounded, and a movable contact element 72c for establishing an electric connection between the terminals 72a and 72b. Usually, the movable contact element 72c is resiliently biased so as to be spaced from the terminals 72a and 72b, and thus an electric connection is not established between the terminals 72a and 72b. The slidable cover plate 73 has a nob element 73a integrally formed at one end thereof, and the nob element 73a is extended through the opening 11a of the camera body 11. Also, the slidable cover plate 73 has a push element 73b projected from the other end thereof, and the push element 73b is aligned with the movable contact element 72c.

When the slidable cover plate 73 is moved from the closed position (FIG. 17) to the open position (FIG. 18) by pushing the nob element 73a with, for example, a thumb or finger of a user. The push element 73b is abutted against the movable contact element 72c, and then moves the same toward the terminals 72a and 72b so that the movable contact element 72c becomes in contact with the terminals 72a and 72b. Thus, the electric connection is established between the terminals 72a and 72b, so that the electric potential of the terminal 72a falls to the ground level. This fall of the electric potential to the ground level is detected by the system control circuit 20. In short, the slidable cover plate 73 must be moved from the closed position to the open position before the interface connectors 81a and/or 82a can be connected to the output terminal connectors 17a and/or 17b, and thus the connection between the interface connectors 81a and/or 82a and the output terminal connectors 17a and/or 17b can be indirectly detected by the fall of the electric potential (terminal 72a) to the ground level.

Figure 19:
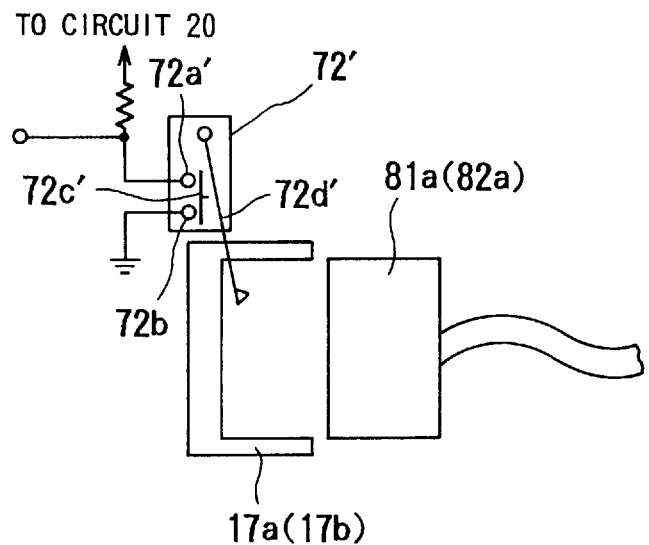
FIG. 19 is a schematic view showing another embodiment of the connector-connection detecting circuit.
Figure 20:
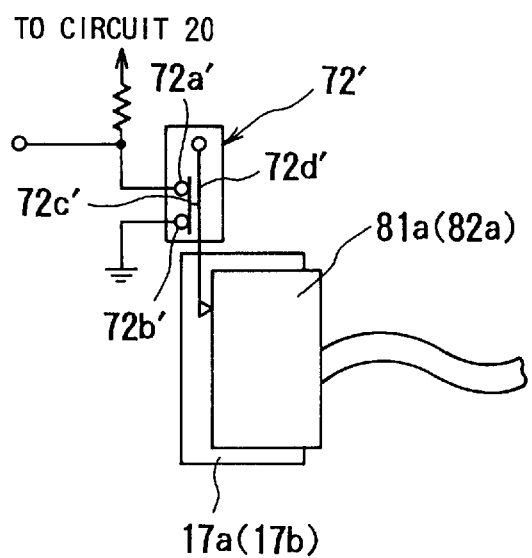
FIG. 20 is a schematic view similar to FIG. 19, showing a part of the elements at different positions.

FIGS. 19 and 20 schematically show another embodiment of the connector-connection detecting circuit 72' constituted such that the connection between the interface connector (81a, 82a) and the output terminal connector 17a, 17b is directly detected. In this embodiment, the connector-connection detecting circuit 72' is associated with each of the output terminal connectors 17a and 17b, and includes a terminal 72a' having a suitable electric potential applied thereto, a terminal 72b' grounded, a movable contact element 72c' for establishing an electric connection between the terminals 72a' and 72b', and a pivoted arm element 72d' for pushing the movable contact element 72c' toward the terminals 72a' and 72b'. Similar to the case mentioned above, usually, the movable contact element 72c' is resiliently biased so as to be spaced from the terminals 72a' and 72b', and thus an electric connection is not established between the terminals 72a' and 72b'. Also, usually, the arm element 72d' is resiliently biased so as to be spaced from the movable contact element 72c'.

When the interface connecter (81a, 82b) is connected to the output terminal connector (17a, 17b), as shown in FIG. 20, the arm element 72d' is pressed against the movable contact element 72c', resulting in moving the movable contact element 72c' toward the terminals 72a' and 72b' so that the movable contact element 72c' becomes in contact with the terminals 72a' and 72b'. Thus, the electric connection is established between the terminals 72a' and 72b', so that the electric potential of the terminal 72a' falls to the ground level. This fall of the electric potential to the ground level is detected by the system control circuit 20. Namely, according to the arrangement of the connector-connection detecting circuit 72' shown in FIGS. 19 and 20, the connection between the interface connectors (81a, 82a) and the output terminal connectors (17a, 17b) can be directly detected by the fall of the electric potential (terminal 72a') to the ground level.

Figure 21:
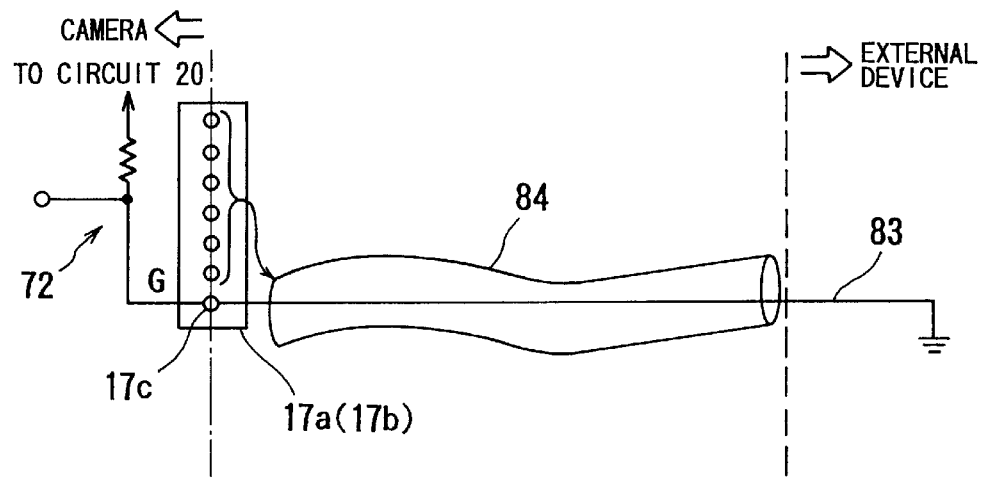
FIG. 21 is a schematic view showing yet another embodiment of the connector-connection detecting circuit.

FIG. 21 schematically shows yet another embodiment of the connector-connection detecting circuit 72 constituted such that the connection between the interface connector (81a, 82a) and the output terminal connector 17a, 17b is directly detected. In this embodiment, the connector-connection detecting circuit 72 includes a terminal end joined to a grounding-contact 17c of the output terminal connector (17a, 17b), and has a suitable electric potential applied thereto. When the interface connector (81a, 82a) is connected to the output terminal connector (17a, 17b), the contact 17c of the output terminal connector (17a, 17b) is grounded through the intermediary of a grounding-line 83 included in the cable 84 extended from the interface connector (81a, 82a), so that the electric potential of the connector-connection detecting circuit 72 falls to the ground level. This fall of the electric potential to the ground level is detected by the system control circuit 20. Namely, the connection between the interface connectors (81a, 82a) and the output terminal connectors (17a, 17b) can be directly detected by the fall of the electric potential (circuit 72) to the ground level.

Figure 22:
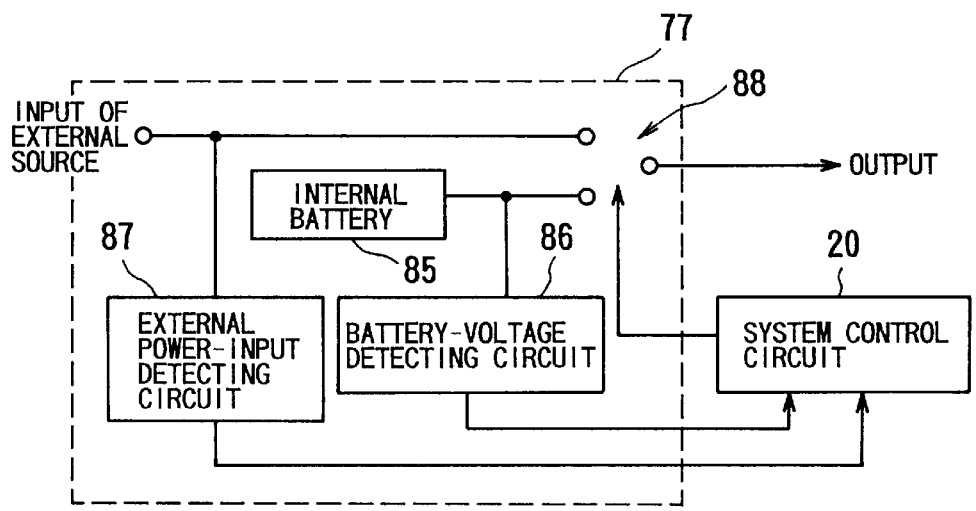
FIG. 22 is a block diagram of a main power source circuit of the electronic still video camera shown in FIGS. 9 and 10.

FIG. 22 shows a block diagram of the main power source circuit 77 which includes an exchangeable internal battery 85, and a battery-voltage detecting circuit 86 for detecting an output voltage of the internal battery 85. The detection of the output voltage of the internal battery 85 is carried out at regular time intervals of, for example, 1 second, and the detected output voltage data is fetched by the system control circuit 20 in which it is determined whether or not the detected data is lower than a given level. If the detected data is lower than the given level, a message is displayed on the display device 68 for warning that the internal battery should be exchanged for a new one.

The main power source circuit 77 also includes an external power-input detecting circuit 87 for detecting an input or connection of an external power source (not shown) such as an AC power adapter, a detachable additional battery power pack, or the like. When the input or connection of the external power source is detected, a detecting signal outputted from the external power-input detecting circuit 87 to the system control circuit 20 is changed from the low level to the high level, whereby the input or connection of the external power source is confirmed by the system control circuit 20.

The main power source circuit 77 further includes a switching circuit 88 which is controlled by the system control circuit 20. Usually, the internal power battery 85 is switched ON by the switching circuit 88. However, whenever the input or connection of the external power source is detected by the external power-input detecting circuit 87, the internal power battery 85 is switched OFF, and the external power source is switched ON by the switching circuit 88.

When a main switch (not shown) of the camera is turned ON, first, the main power source circuit 77 is energized to supply the camera with an electric power from the internal power source 85 or the external power source. Namely, unless an input or connection of the external power source is detected by the external power-input detecting circuit 87, the internal battery 85 is switched ON by the switching circuit 88. If the input or connection of the external power source is detected by the external power-input detecting circuit 87, the used of the eternal power source is switched ON by the switching circuit 88. On the other hand, when the main switch of the camera is turned ON, a release switch disabling flag is initially set to be "0", and thus the release switch 14 is enabled.

Under this circumstance, if the auto-photographing/recording mode (AP) is selected by the operation mode selection switch 18, an AP flag is set to be "1". In this case, the camera executes an operation in the auto-photographing/recording mode (AP) by turning the release switch 14 ON. Namely, in the auto-photographing/recording mode (AP), a photographing operation is executed to record and develop an optical image in the electro-developing recording medium 30, as mentioned above, and then a scanning operation is executed to read the developed image from the electro-developing recording medium 30 by the line sensor 44, such that the read pixel signals are stored in a second recording medium such as an IC memory card, a floppy disk, a detachable hard disk or the like in the image recording device 67. Note, in this mode, the photographing operation is not executed.

If the manual-photographing mode (MP) is selected by the operation mode selection 18, an MP flag is set to be "1". In this case, the camera executes an operation in the manual-photographing mode (MP) by turning the release switch 14 ON. Namely, in the manual-photographing mode (MP), only an execution of the photographing operation is carried out.

If the image-recording mode (IR) is selected by the operation mode selection switch 18, an IR flag is set to be "1". In this case, the camera executes an operation in the image-recording mode (IR) by turning the release switch 14 ON. Namely, in the image-recording mode (IR), an execution of the scanning operation is carried out such that the pixel signals read from the electro-developing recording medium 30 are stored in a second recording medium, such as an IC memory card, a floppy disk, a detachable hard disk or the like, loaded in the image recording device 67.

If the externally-outputting mode (EO) is selected by the operation mode selection switch 18, an EO flag is set to be "1". In this case, the camera executes an operation in the externally-outputting mode (E0) by turning the release switch 14 ON. Namely, in the externally-outputting mode (EO), only an execution of the scanning operation is carried out such that the pixel signals read from the electro-developing recording medium 30 are transferred to the personal computer 81.

If the auto-video-monitor mode (AV) is selected by the operation mode selection switch 18, an AV flag is set to be "1". In this case, the camera executes an operation in the auto-video-monitor mode (AV) by turning the release switch 14 ON. Namely, in the auto-video-monitor mode (AV), an execution of the photographing operation is carried out, and then an execution of the scanning operation is carried out such that the read pixels signals are processed in and are transferred from the video signal outputting circuit 74 to the TV monitor 82.

If the manual-video-monitor mode (MV) is selected by the operation mode selection switch 18, an MV flag is set to be "1". In this case, the camera executes an operation in the manual-video-monitor mode (MV) by turning the release switch 14 ON. Namely, in the manual-video-monitor mode (MV), only an execution of the scanning operation is carried out such that the read pixel signals are processed in and are transferred from the video signal outputting circuit 74 to the TV monitor 82.

If the image-erasing mode (IE) is selected by the operation mode selection switch 18, an IE flag is set to be "1". In this case, the camera executes an operation in the image-erasing mode (IE) by turning the release switch 14 ON. Namely, in the image-erasing mode (IE), an image-erasing operation is executed to thermally erase a recorded and developed image from the electro-developing recording medium 30 by moving the movable member 52 carrying the electric heater element 75a.

Whenever the image-erasing operation is completed, an image erasing completion (IEC) flag is set to be "1", and, whenever the photographing operation is completed, the IEC flag is reset to be "0". Namely, by obtaining access to the IEC flag, it can be determined whether or not the electro-developing recording medium 30 has an image recorded and developed therein. The IEC flag is defined in a non-volatile memory provided in the system control circuit 20, and thus the setting of the IEC flag can be kept even if the main switch of the camera is turned OFF.

Further, when one of the scanning modes [1], [2], [3], [4], and [5] is selected by the scanning mode selection switch 19, a corresponding flag is set to be "1", whereby operation-parameter data (for example, data for regulating intervals of an intermittent movement of the movable member 52 and so on) necessary for executing the scanning operation in the selected scanning mode are read from a read-only memory (ROM) provided in the system control circuit 20.

Figure 23:
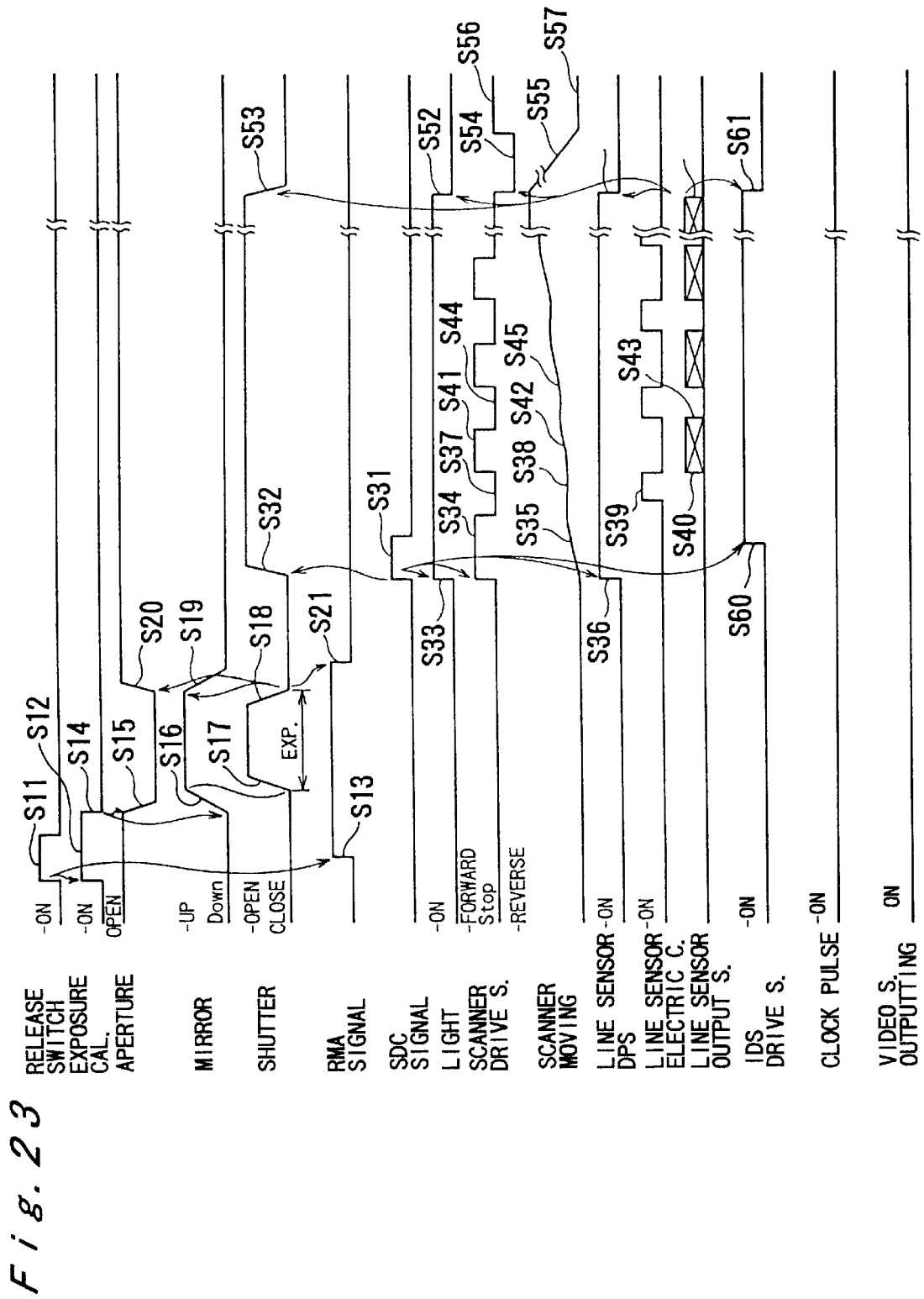
FIG. 23 is a timing chart for explaining an operation of the electronic still video camera (FIGS. 9 and 10) in an auto-photographing/recording mode.
Figure 24:
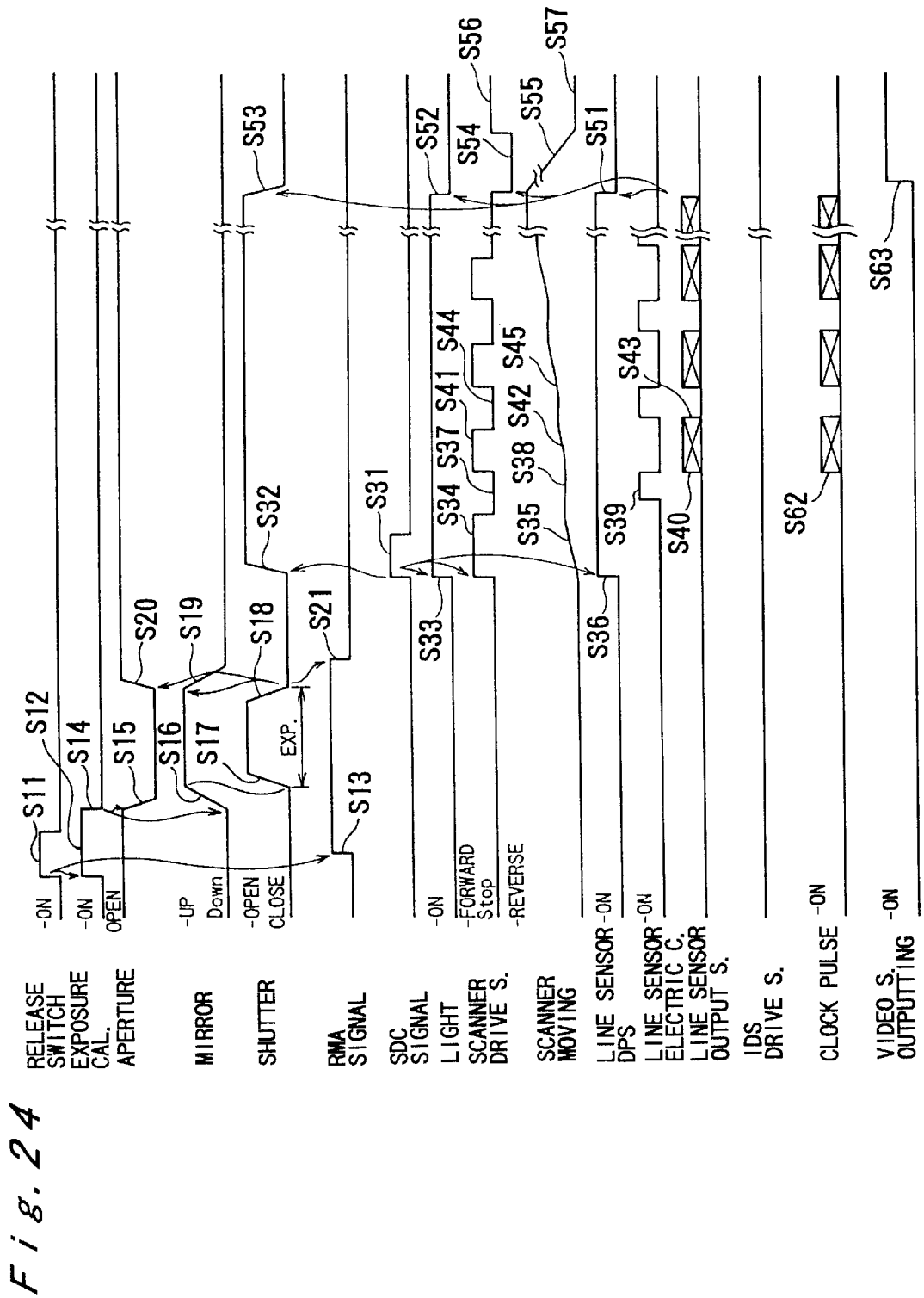
FIG. 24 is a timing chart for explaining an operation of the electronic still video camera (FIGS. 9 and 10) in an auto-video-monitor mode.
Figure 25:
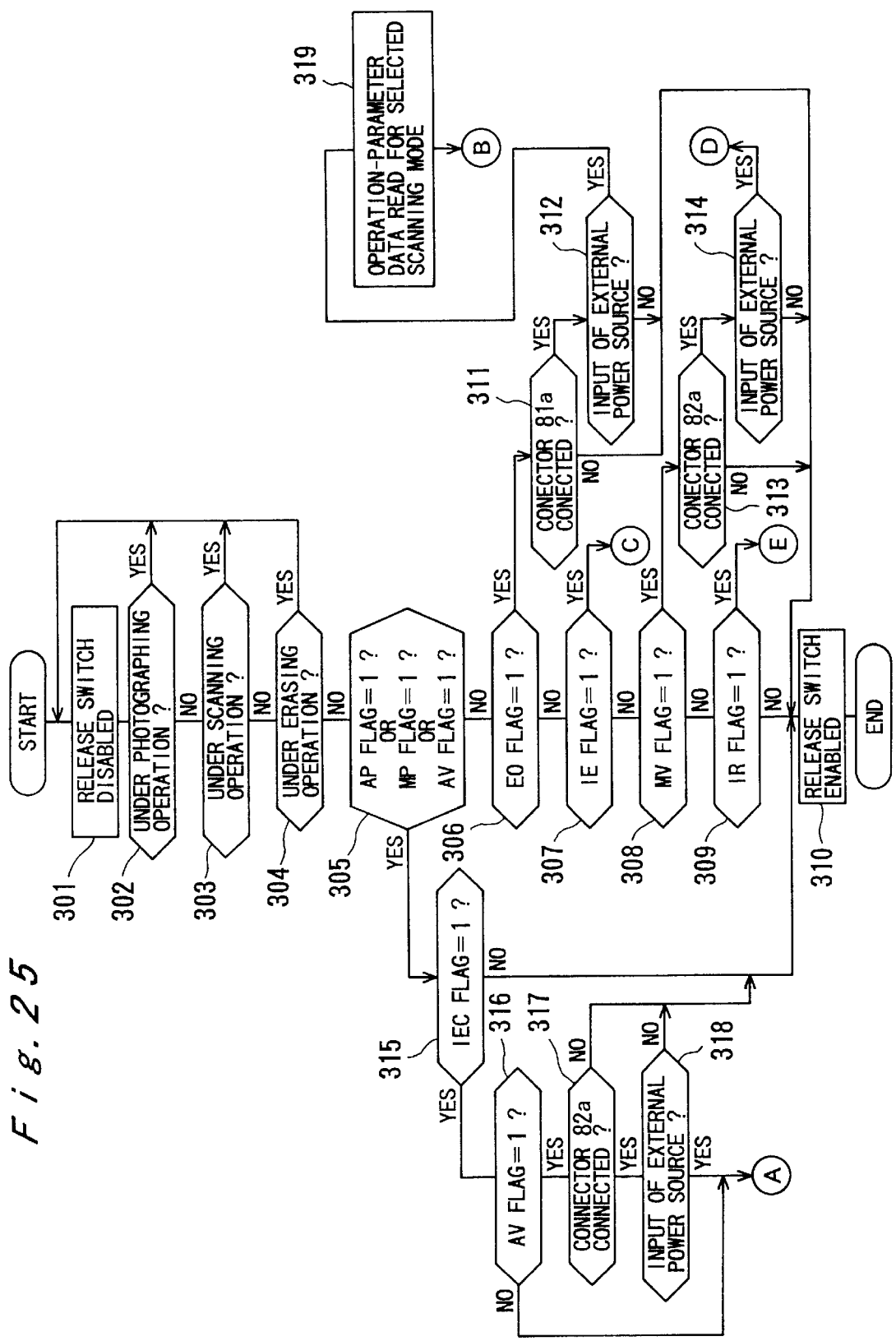
FIG. 25 is a part of a flowchart for explaining a whole operation of the electronic still video camera shown in FIGS. 9 and 10.
Figure 26:
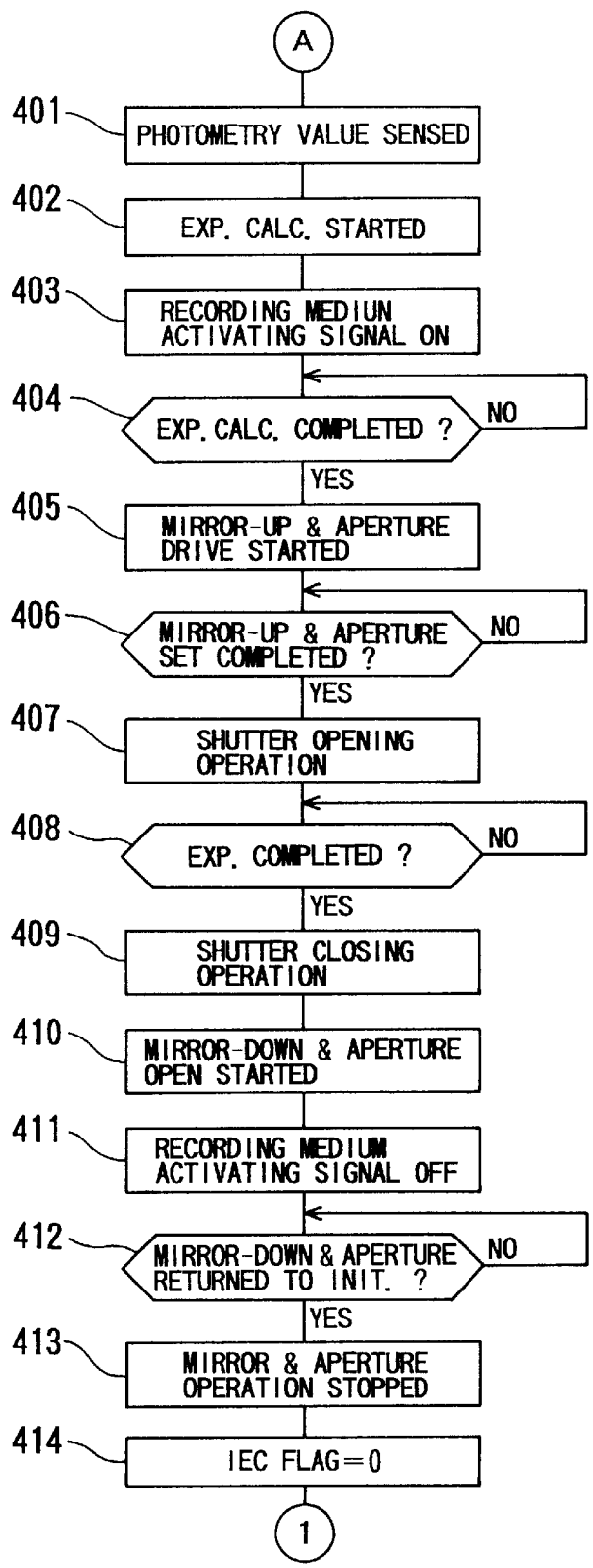
FIG. 26 is another part of the flowchart for explaining the whole operation of the electronic still video camera shown in FIGS. 9 and 10.

FIG. 23 shows a timing chart for explaining the operation of the camera in the auto-photographing/recording mode (AP), and FIG. 24 shows a timing chart for explaining the operation in the auto-video-monitor mode (AV). FIGS. 25 to 30 show a flowchart for explaining a whole operation of the second embodiment of the camera according to the present invention.

For example, when the release switch 14 has been turned ON after the auto-photographing/recording mode (AP) is selected by the operation mode selection switch 18 (the AP flag=1), a command signal for executing the operation is made ON (reference "S11" in FIG. 23), and is inputted to the system control circuit 20. Then, at step 301, the release switch disabling flag is set to "1", and thus the release switch 14 is disabled.

At step 302, it is determined whether or not the camera is in the course of the photographing operation for recording and developing an optical image in the electro-developing recording medium 30. This determination can be carried out by detecting, for example, whether or not the quick return mirror 21 is at the initial position or down-position. If the camera is in the course of the photographing operation, the control returns to step 301. If the camera is not in the course of the photographing operation, the control proceeds from step 302 to step 303.

At step 303, it is determined whether or not the camera is in the course of the scanning operation for electronically reading the developed image from the electro-developing recording medium 30. This determination can be carried out by detecting, for example, whether or not the movable member 52 is at the initial position or removal position. If the camera is in the course of the scanning operation, the control returns to step 301. If the camera is not in the course of the scanning operation, the control proceeds from step 303 to step 304.

At step 304, it is determined whether or not the camera is in the course of the erasing operation for thermally erasing the developed image from the electro-developing recording medium 30. This determination can be also carried out by detecting, for example, whether or not the movable member 52 is at the initial position or removal position. If the camera is in the course of the erasing operation, the control returns to step 301. If the camera is not in the course of the scanning operation, the control proceeds from step 304 to step 305.

At step 305, it is determined whether or not one of the AP, MV, and AV flags is "1", i.e., whether or not a mode, in which the execution of the photographing operation is involved, has been selected. At this stage, since the auto-photographing/recording mode (AP) is selected (the AP flag=1), the control proceeds from step 305 to step 315, in which it is determined whether or not the image-erasing completion (IEC) flag is "0". If the IEC=0, i.e., if the electro-developing recording medium 30 has an image recorded and developed therein, the control proceeds from step 315 to step 310, in which the release switch 14 is enabled. Thus, this routine is ended. i.e., the operation based open the auto-photographing/recording mode is erroneously finished. Namely, the execution of an image-erasing operation should be carried out by selecting the image-erasing mode (IE) and by turning the release switch 14 ON, before an operation can be executed in the auto-photographing/recording mode (AP).

At step 315, if the image-erasing completion (IEC) flag is "1", i.e., if the electro-developing recording medium 30 has no image recorded and developed therein, the control proceeds from step 315 to step 316, in which it is determined whether or not the AV flag is "1". At this stage, since the AV flag=0, i.e., since the auto-video-monitor mode is not selected, the control proceeds to step 401 (FIG. 26), in which an execution of the photographing operation is started.

In particular, at step 401, an output signal of the photometry sensor 28, i.e., a photometry value, is sensed and fetched by the system control circuit 20, and then the control proceeds to step 402, in which an exposure calculation is started based on the fetched photometry value (reference "S12" in FIG. 23). After a predetermined period of time has elapsed from the ON operation of the release switch 14, the control proceeds to step 403, in which a recording medium activating signal outputted from the recording medium drive circuit 41 to the electro-developing recording medium 30 is made ON (reference "S13" in FIG. 23). Namely, the recording medium activating signal is changed from the low level to the high level, so that the activating voltage is applied between the electrostatic information recording medium 31 and the electric charge keeping medium 32. Then, at step 404, it is determined whether or not the exposure calculation has been completed. When the exposure calculation has been completed (reference "S14" in FIG. 23), the procedures necessary for the photographing operation are subsequently carried out in the following steps on the basis of the calculated result.

At step 405, an opening area of the aperture 12a is adjusted in accordance with the calculated result. Note, since the aperture 12a initially has the fully-open area, the adjustment of the aperture 12a is usually carried out such that a fully-open area thereof is made small (reference "S15" in FIG. 23). Also, at step 405, the quick return mirror 21 is changed from the down-position to the up-position (reference "S16" in FIG. 23).

At step 406, it is determined whether or not the quick return mirror 21 has been changed from the down-position to the up-position, and whether or not the adjustment of the aperture 12a has been completed. Then, the control proceeds from step 406 to step 407, in which the shutter 22 is opened (reference "S17" in FIG. 23), whereby an optical image is focussed and formed on the electro-developing recording medium 30.

At step 408, it is determined whether or not an exposure period of time, which is designated by the calculated result, has elapsed. When the exposure period of time has elapsed, i.e., when the exposure is completed, the control proceeds to step 409, in which the shutter 22 is closed (reference "S18" in FIG. 23). After the closing of the shutter 22 is completed, the control proceeds to step 410, in which the quick return mirror 21 is returned from the up-position to the down-position (reference "S19" in FIG. 23), and in which the opening area of the aperture 12a is returned to the fully-open area (reference "S20" in FIG. 23). Then, at step 411, the output of the recording medium activating signal is stopped (reference "S21" in FIG. 23).

Namely, the output of the recording medium activating signal to the electro-developing recording medium 30 is at least kept on during the period of time during which the shutter 22 is opened, whereby recording and development of the optical image can be carried out in the electro-developing recording medium 30. As mentioned above, the electric charge keeping medium 32 of the electro-developing recording medium 30 is constituted as a memory type liquid crystal display, and the developed image can be held therein even if the output of the recording medium activating signal is stopped.

At step 412, it is determined whether or not the quick return mirror 21 has moved to the initial position or down-position, and whether or not the opening area of the aperture 12a has returned to the initial area or fully-open area. Then, the control proceeds from step 412 to step 413, in which the driving of the quick return mirror 21 and the aperture 12a are stopped. Thus, the execution of the photographing operation is finished. Thereafter, the control proceeds to step 414, in which image-erasing completion (IEC) flag is reset to be "0". Namely, the resetting of the IEC flag means that the electro-developing recording medium 30 has an image recorded and developed therein.

Subsequently, the control proceeds from step 414 to step 415 (FIG. 27), in which an execution of the scanning operation is started.

Figure 28:
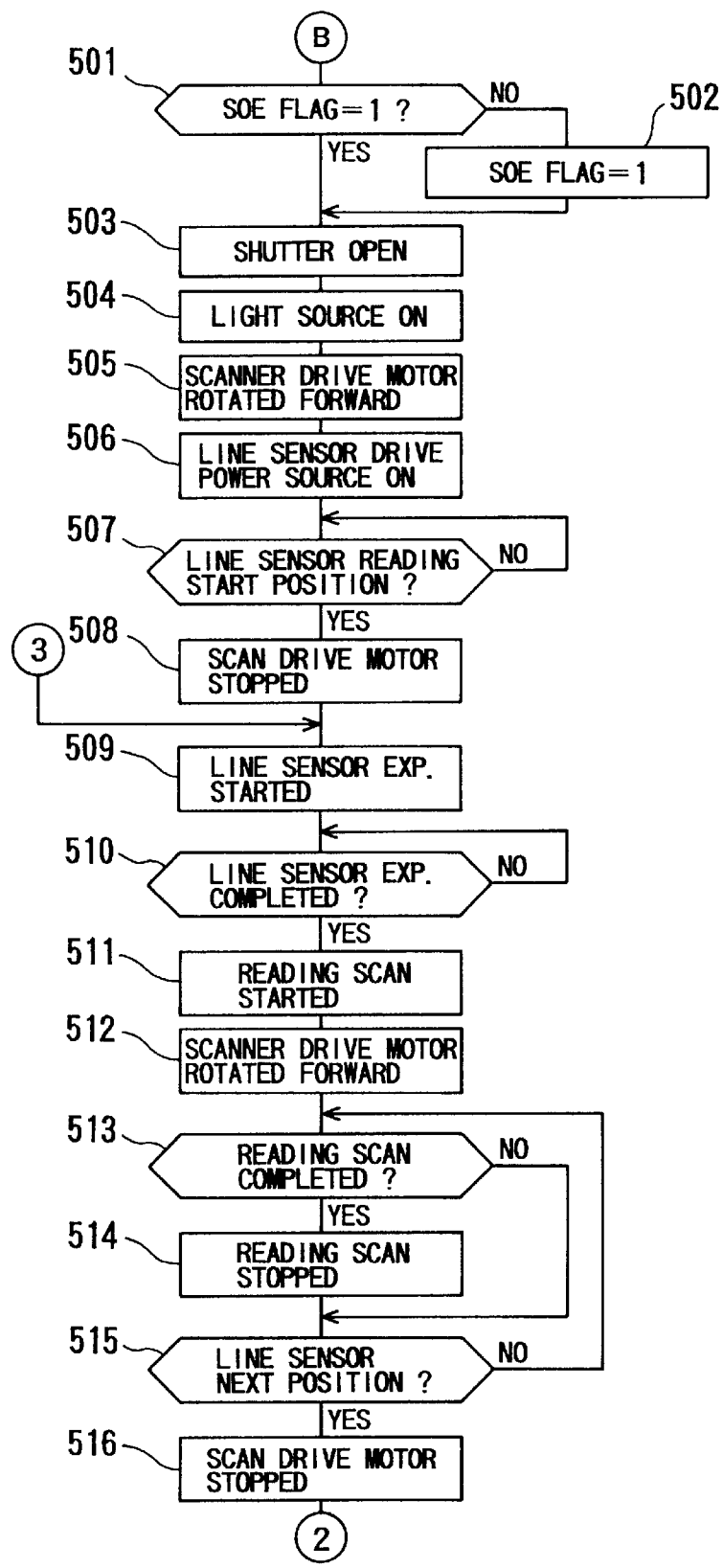
FIG. 28 is still yet another part of the flowchart for explaining the whole operation of the electronic still video camera shown in FIGS. 9 and 10.
Figure 29:
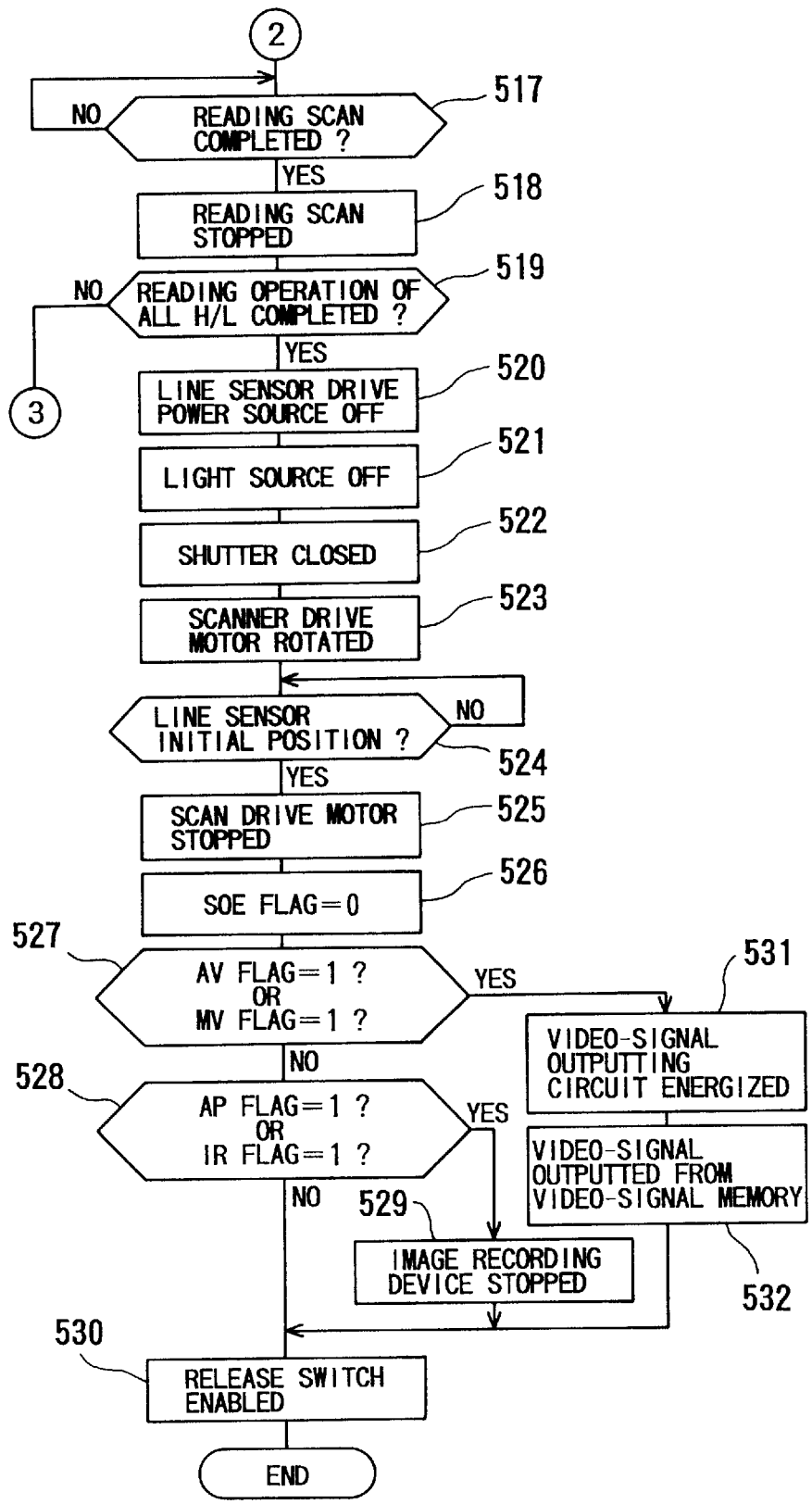
FIG. 29 is still yet another part of the flowchart for explaining the whole operation of the electronic still video camera shown in FIGS. 9 and 10.
Figure 30:
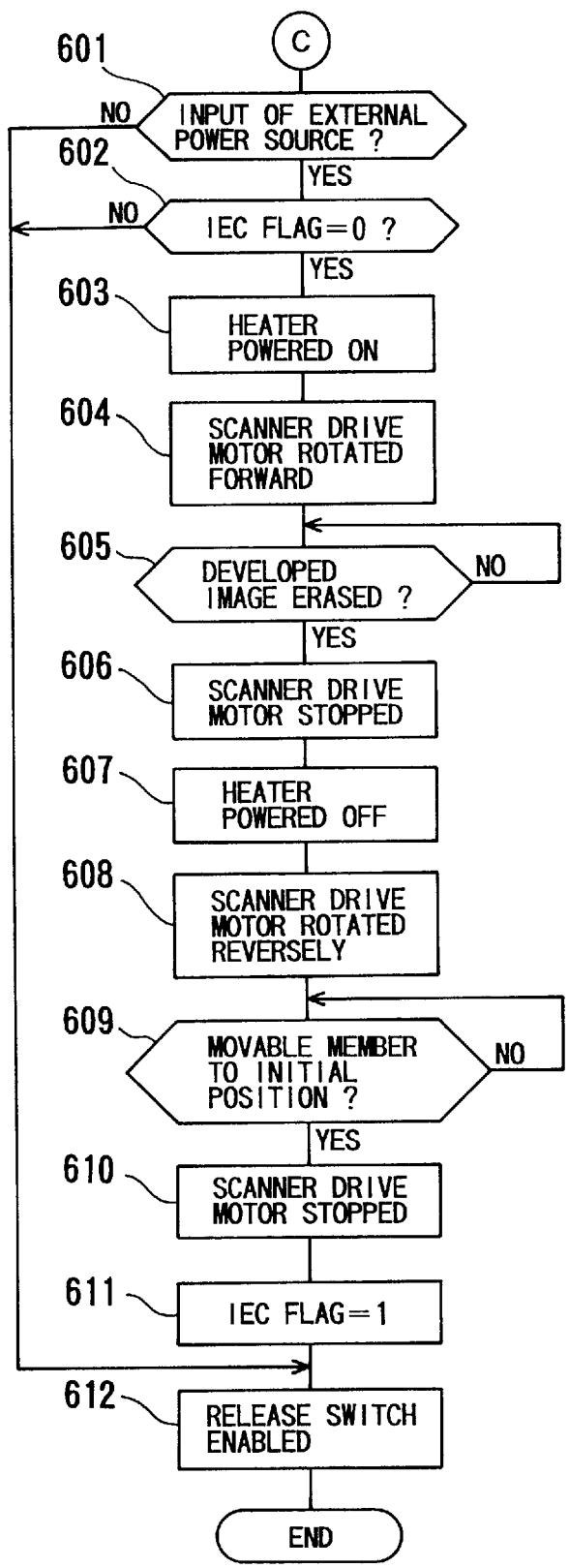
FIG. 30 is the remaining part of the flowchart for explaining the whole operation of the electronic still video camera shown in FIGS. 9 and 10.

In particular, at step 415, a scanning operation enabling (SOE) flag is set to be "1" to thereby enable the scanning operation, and a scanner drive command signal for enabling the execution of the scanning operation is made ON (reference "S31" in FIG. 23). Then, the control proceeds from step 415 to step 416, in which it is determined whether or not the AP flag is "1". At this stage, since the auto-photographing/recording mode (AP) is selected (the AP flag=1), the control proceeds from step 416 to step 417, in which the operation-parameter data necessary for executing the scanning operation in the selected scanning mode [1], [2], [3], [4] or [5] is read from the read-only memory (ROM) of the system control circuit 20. Then, the control proceeds to step 418, in which a drive signal outputted from the recording device control circuit 66 to the image recording device 67 is made ON (reference "S60" in FIG. 23), so that the storage of pixel signals in the second recording medium such as an IC memory card, a floppy disk, a detachable hard disk or the like loaded therein is enabled. Thereafter, the control proceed from step 418 to step 501 (FIG. 28).

At step 501, it is determined whether or not the scanning operation enabling (SOE) flag is "1". If the SOE flag=0, the control proceeds to step 502, in which the SOE flag is set to be "1". However, at this stage, the SOE flag is already "1"(step 415), and thus the control proceeds from the step 501 to step 503, in which the shutter 22 is opened (reference "S32" in FIG. 23).

At step 504, the light source 42 is made ON (reference "S33" in FIG. 23). Then, the control proceeds to step 505, in which a scanner drive signal outputted from the system control circuit 20 to the scanner drive circuit 46 is changed from the zero level to the positive level (reference "S34" in FIG. 23), so that the scan drive motor 55 is driven in a forward direction due to the drive pulses outputted from the scanner drive circuit 46 thereto, whereby the movable member 52 of the scanning mechanism 50 starts to move upward from the removal position toward an image-reading start position (reference "S35" in FIG. 23). Subsequently, at step 506, a line sensor drive power source included in the line sensor drive circuit 47 is made ON (reference "S36" in FIG. 23).

At step 507, it is determined whether or not the line sensor 44 supported by the movable member 52 has been moved to an image-reading start position. When the line sensor 44 reaches the image-reading start position, the control proceeds to step 508, in which the scanner drive signal outputted from the system control circuit 20 to the scanner drive circuit 46 is returned from the positive level to the zero level (reference "S37" in FIG. 23), and thus the output of the drive pulses from the scanner drive circuit 46 to the scan drive motor 55 is interrupted to thereby stop the scan drive motor 55 (reference "S38" in FIG. 23), whereby the line sensor 44 is held at the image-reading start position. Note, the standing still of the line sensor 44 at the image-reading start position may be controlled by, for example, counting the driving pulses outputted from the scanner drive circuit 46 to the scan drive motor 55.

At step 509, an exposure of the line sensor 44 is started by the illumination of the light source 42, and thus electric charge accumulation in the line sensor 44 is performed (reference "S39" in FIG. 23). Then, at step 510, it is determined whether or not a given time has elapsed or the electric charge accumulation in the line sensor 44 has been completed. When the electric charge accumulation in the line sensor 44 is completed, the control proceeds to step 511, in which a reading-scan of pixel signals from the line sensor 44, (i.e., a first horizontal-scanning line) is started by the line sensor drive circuit (reference "S40" in FIG. 23).

At step 512, the scanner drive signal outputted from the system control circuit 20 to the scanner drive circuit 46 is changed from the zero level to the positive level (reference "S41" in FIG. 23), so that the scan drive motor 55 is driven in the forward direction due to the drive pulses outputted from the scanner drive circuit 46 thereto, whereby the movable member 52, and therefore, the line sensor 44 is moved upward (reference "S42" in FIG. 23).

During the movement of the line sensor 44, it is determined at step 513 whether or not the reading-scan of pixel signals from the line sensor 44 has been completed. If the completion of the reading-scan is confirmed, the control proceeds to step 514, in which the reading-scan of pixel signals from the line sensor 44 is stopped (reference "S43" in FIG. 23). Note that the completion of the reading-scan can be known by, for example, counting reading-clock pulses outputted from the line sensor drive circuit 47 to drive the line sensor 44.

At step 513, if the completion of the reading-scan is not confirmed, the control skips over step 514, and then the control proceeds to step 515, in which it is determined whether or not the line sensor 44 has been moved to a next image-reading position (corresponding to a position at which the pixel signals included in a second horizontal scanning line are read). If the line sensor 44 has not reached the next image-reading position, the control returns to step 513, and the routine comprising steps 513, 514, and 515 is repeated until the line sensor 44 reaches the next image-reading position.

At step 513, if the completion of the reading-scan is confirmed, the control proceeds to step 514, in which the reading-scan of pixel signals from the line sensor 44 is stopped. Then, the control proceeds to step 515.

At step 515, when it is confirmed that the line sensor 44 has reached the next image-reading position, the control proceeds from step 515 to step 516, in which the scanner drive signal outputted from the system control circuit 20 to the scanner drive circuit 46 is returned from the positive level to the zero level (reference "S44" in FIG. 23), and thus the output of the drive pulses from the scanner drive circuit 46 to the scan drive motor 55 is interrupted to thereby stop the scan drive motor 55 (reference "S45" in FIG. 23), whereby the line sensor 44 is held at the next image-reading position. Similarly, the standing still of the line sensor 44 at the next image-reading position can be controlled by counting the driving pulses outputted from the scanner drive circuit 46 to the scan drive motor 55.

Then, at step 517 (FIG. 29), it is again determined whether or not the reading-scan of the single-line of pixel signals from the line sensor 44 has been completed. This is because the control may proceed from step 515 to step 516 without having any access to step 514, i.e., because there may be a case where the reading-scan of the pixel signals from the line sensor 44 is not yet completed even after the line sensor 44 reaches the next image-reading position. When the completion of the reading-scan is confirmed at step 517, the control proceeds to step 518 (FIG. 29), in which the operation for the reading-scan is stopped.

At step 519, it is determined whether or not the whole of the developed image has been completely read, i.e., the reading-scans have been completed on all of the horizontal-scanning lines defined by intervals of the intermittent movements of the line sensor 44. This determination is made possible by, for example, counting the drive pulses outputted from the scanner drive circuit 46. If the whole of the developed image has not been completely read, the control returns to step 509 (FIG. 28). Namely, the routine comprising steps 509 to 519 is repeated until the reading-scans are completed on all of the horizontal-scanning lines.

The pixel signals read out of the line sensor 44 are amplified by the amplifier 61, and are then converted to digital pixel signals by the A/D converter 62. The digital pixel signals are subjected to a shading correction, a gamma correction and so on by the image processing circuit 63, and are then temporarily stored in the memory 64. Subsequently, the digital pixel signals are read out of the memory 64 through the image processing circuit 63, and are then outputted to the image recording device 67 through the recording device control circuit 66, whereby the digital pixel signals are stored in the second recording medium, such as an IC memory card, a floppy disk, a detachable hard disk or the like, loaded in the image recording device 67. This is because, at step 418, the recording device control circuit 66 is energized to thereby operate the image recording device 67.

At step 519, when the whole of the developed image has been completely read (reference "S50" in FIG. 23), the control proceeds to step 520, in which the line sensor drive power source included in the line sensor drive circuit 47 is made OFF (reference "S51" in FIG. 23). Then, at step 521, the light source 42 is made OFF (reference "S52" in FIG. 23), and at step 522, the shutter 22 is closed (reference "S53" in FIG. 23). Subsequently, at step 523, the scanner drive signal outputted from the system control circuit 20 to the scanner drive circuit 46 is changed from the zero level to the negative level (reference "S54" in FIG. 23), so that the scan drive motor 55 is driven in a reverse direction due to the drive pulses outputted from the scanner drive circuit 46 thereto, whereby the movable member 52 (the line sensor 44) of the scanning mechanism 50 starts to move downward toward the removal or initial position (reference "S55" in FIG. 23).

At step 524, it is determined whether or not the line sensor 44 has been moved to the initial position. When the line sensor 44 reaches the initial position, the control proceeds to step 525, in which the scanner drive signal outputted from the system control circuit 20 to the scanner drive circuit 46 is returned from the negative level to the zero level (reference "S56" in FIG. 23), and thus the output of the drive pulses from the scanner drive circuit 46 to the scan drive motor 55 is stopped, i.e., the scan drive motor 55 is stopped (reference "S57" in FIG. 23), whereby the line sensor 44 is held at the initial or removal position thereof. The standing still of the line sensor 44 at the initial position may be known by detecting a part of the movable member 52 with, for example, a photo-interrupter type detector (not shown).

At step 526, the scanning operation enabling (SOE) flag is reset to be "0" to thereby disable the scanning operation. Then, the control proceeds to step 527, in which it is determined whether or not one of the AV and MV flags is "1". At this stageflags both the AV and MV flags are "0", the control proceeds from 527 to step 528, in which it is determined whether or not one of the AP and IR flags is "1". At this stage, since the AP flag=1, the control proceeds to step 529, in which the drive signal outputted from the recording device control circuit 66 to the image recording device 67 is made OFF (reference "S61" in FIG. 23), so that the storage of pixel signals in the second recording medium is disabled. Then, the control proceeds to step 530, in which the release switch 14 is enabled. Thus, this routine is ended, i.e., the operation based upon the auto-photographing/ recording mode (AP) is finished.

When the release switch 14 has been turned ON after the manual-photographing mode (MP) is selected by the operation mode selection switch 18 (the MP flag=1), only the photographing operation is executed, as mentioned above.

Namely, the routine comprising the sequential steps for executing the photographing operation is carried out in the same manner as in the auto-photographing/recording mode (AP). After the photographing operation is completed, the control proceeds from step 416 to step 419 (FIG. 27), because the AP flag is "0" at step 416 (the MP flag=1). At step 419, it is determined whether or not one of the AV and MV flags is "1". At this stage, since both the AV and MV flags are "0", the control proceeds to step 422, in which the release switch 14 is enabled. Thus, this routine is ended, i.e., the operation based upon the manual-photographing mode (MP) is finished.

When the release switch 14 has been turned ON after the image-recording mode (IR) is selected by the operation mode selection switch 18 (the IR flag=1), the scanning operation is executed such that the pixel signals read from the electro-developing recording medium 30 are stored in the second recording medium, such as an IC memory card, a floppy disk, a detachable hard disk or the like, loaded in the image recording device 67, as mentioned above.

Figure 27:
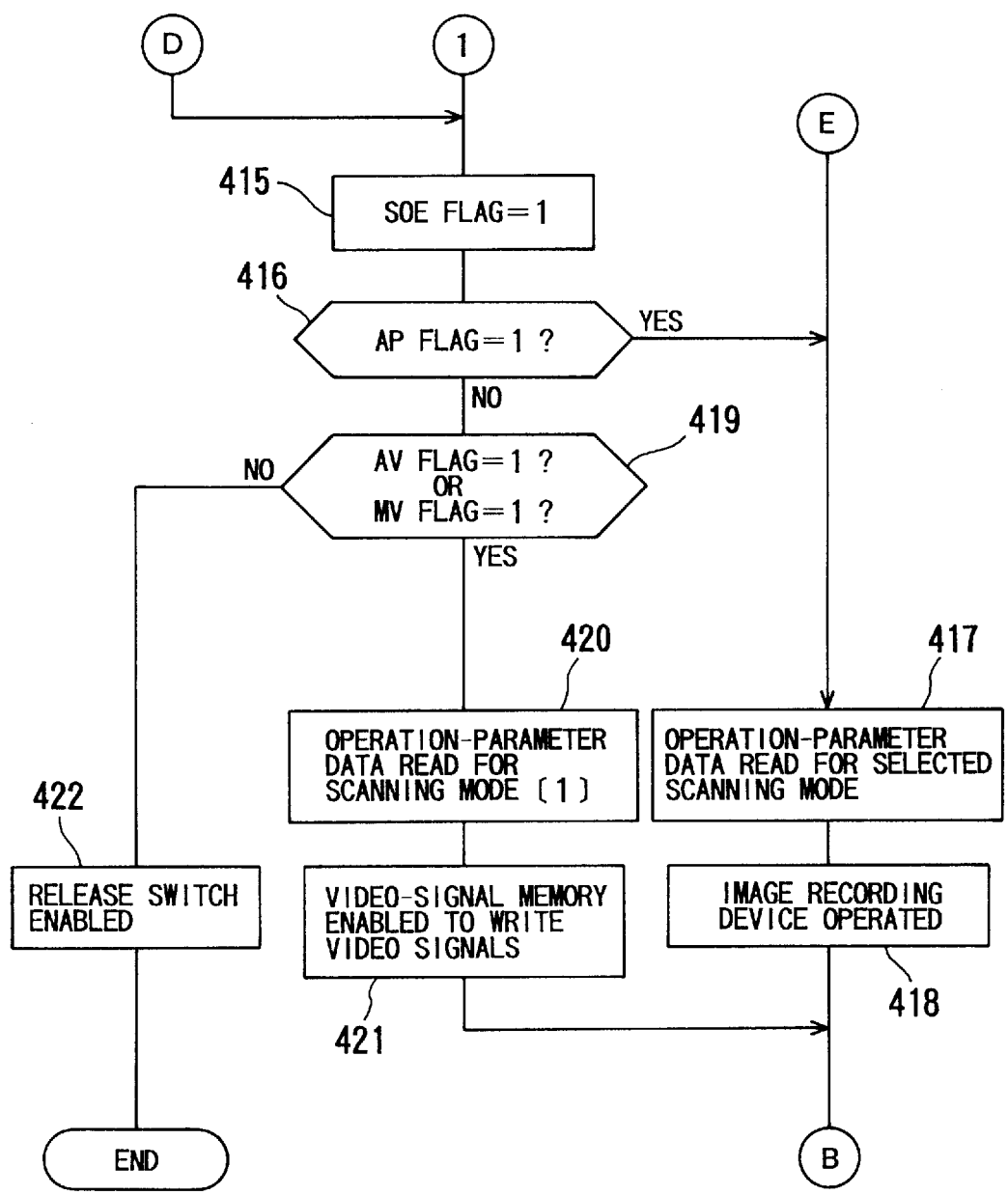
FIG. 27 is yet another part of the flowchart for explaining the whole operation of the electronic still video camera shown in FIGS. 9 and 10.

In particular, the routine comprising steps 301 to 304 is carried out in the same manner as in the auto-photographing/recording mode (AP), but the control proceeds from step 305 to step 306, because all of the AP, MV, and AV flags are "0". At step 306, it is determined whether or not the EO flag is "1". At this stage, since the EO flag=0, the control proceeds to step 307, in which it is determined whether or not the IE flag is "1". At this stage, since the IE flag=0, the control proceeds to step 308, in which it is determined whether or not the MV flag is "1". At this stage, since the MV flag=0, the control proceeds to step 309, in which it is determined whether or not the IR flag is "1". At this stage, since the IR flag=1, the control proceeds from step 309 to step 417 (FIG. 27). Accordingly, the routine comprising the sequential steps for executing the scanning operation is carried out in the same manner as in the auto-photographing/recording mode (AP), and the pixel signals read out of the image recorded and developed in the electro-developing recording medium 30 are stored in the second recording medium loaded in the image recording device 67. Thus, this routine is ended, i.e., the operation based upon the image-recording mode (IR) is finished. Note, in the image-recording mode (IR), the control proceeds from step 528 to step 529 due to the IR flag=1.

When the release switch 14 has been turned ON after the externally-outputting mode (EO) is selected by the operation mode selection switch 18, only an execution of the scanning operation is carried out such that the pixel signals read from the electro-developing recording medium 30 signals are transferred to the personal computer 81, as mentioned above. Namely, the scanning operation is executed in the same manner as in the auto-photographing/recording mode (AP), except that the pixel signals read from the electro-developing recording medium 30 are transferred to the personal computer 81 without recording the pixel signals in the second recording medium loaded in the image recording device 67.

In particular, the routine comprising steps 301 to 305 is executed in the same manner as in the image-recording (IR) mode, and the control proceeds from step 306 to step 311, because of the EO flag=1. At step 311, it is determined whether or not the interface connector 81a is connected to the output terminal connector 17a, and this determination is possible in the manner as explained above with reference to FIGS. 17 and 18; FIGS. 19 and 20; and FIG. 21.

If the connection of the interface connector 81a to the output terminal connector 17a is not detected, the control proceeds from step 311 to step 310, in which the release switch 14 is enabled. Thus, this routine is ended, i.e., the operation based upon the externally-outputting mode (EO) is erroneously finished.

If the connection of the interface connector 81a to the output terminal connector 17a is detected, the control proceeds from step 311 to step 312, in which it is determined whether or not an input or connection of the external power source is detected by the external power-input detecting circuit 87 of the main power source circuit 77. If the input or connection of the external power source is not detected, the control proceeds from step 312 to step 310, in which the release switch 14 is enabled. Namely, in this case, the operation based upon the externally-outputting mode (EO) also is erroneously finished. This is because an electric power necessary for the transfer of the pixel signals to the personal computer 81 is relatively large, resulting in prematurely consuming the internal battery 85, and because the transfer of the pixel signals to the personal computer 81 may be interrupted due to the premature consumption of the internal battery 85. Accordingly, the external power source should be connected to the power source circuit 77 (FIG. 22) before the transfer of the pixel signals to the personal computer 81 can be ensured.

If the input or connection of the external power source is detected, the control proceeds from step 312 to step 319, in which the operation-parameter data necessary for executing the scanning operation in the selected scanning mode [1], [2], [3], [4] or [5] is read from the read-only memory (ROM) of the system control circuit 20. Then, the control proceeds from step 319 to step 501 (FIG. 28), and the scanning operation is carried out in the same manner as in the auto-photographing/recording mode (AP), except that the pixel signals read from the electro-developing recording medium 30 are transferred to the personal computer 81. After the execution of the scanning operation is completed at step 525, the routine comprising steps 526 and 527 is also executed in the same manner as in the auto-photographing/recording mode (AP), but the control proceeds from step 528 to step 530. Thus, this routine is ended, i.e., the operation based upon the externally-outputting mode is finished.

When the release switch 14 has been turned ON after the auto-video-monitor mode (AV) is selected by the operation mode selection switch 18, the photographing operation is executed, and then the scanning operation is executed such that the pixel signals read from the electro-developing recording medium 30 are processed in and are transferred from the video signal outputting circuit 74 to the TV monitor 82, as mentioned above.

In particular, in the auto-video-monitor mode (AV), the routine comprising steps 301 to 306, and step 315 is executed in the same manner as in the auto-photographing/recording mode (AP), but the control proceeds from step 316 to step 317, because of the AV flag=1. At step 317, it is determined whether or not the interface connector 82a is connected to the output terminal connector 17b, and this determination is possible in the manner as explained above with reference to FIGS. 17 and 18; FIGS. 19 and 20; and FIG. 21.

If the connection of the interface connector 82a to the output terminal connector 17b is not detected, the control proceeds from step 317 to step 310, in which the release switch 14 is enabled. Thus, this routine is ended, i.e., the operation based upon the auto-video-monitor mode (AV) is erroneously finished.

If the connection of the interface connector 82a to the output terminal connector 17b is detected, the control proceeds from step 317 to step 318, in which it is determined whether or not an input or connection of the external power source is detected by the external power-input detecting circuit 87 of the main power source circuit 77. If the input or connection of the external power source is not detected, the control proceeds from step 318 to step 310, in which the release switch 14 is enabled. Namely, in this case, the operation based upon the auto-video-monitor mode (AV) is erroneously finished. This is because the electric power necessary for the transfer of the video signals to the TV monitor 82 is relatively large, resulting in prematurely consuming the internal battery 85, and because the transfer of the video signals to the TV monitor 82 may be interrupted due to the premature consumption of the internal battery 85. Accordingly, the external power source should be connected to the power source circuit 77 before the transfer of the video signals to the TV monitor 82 can be ensured.

If the input or connection of the external power source is detected, the control proceeds from step 318 to step 401 (FIG. 26), and the routine comprising the sequential steps for executing the photographing operation is carried out in the same manner as in the auto-photographing/recording mode (AP). After the photographing operation is completed, the control proceeds to step 415, in which the scanning operation enabling (SOE) flag is set to be "1" to thereby enable the scanning operation. Then, at step 416, it is determined whether or not the auto-photographing/recording (AP) flag is "1". At this stage, since the AP flag=0, the control proceeds from step 416 to step 419. At step 419, it is determined whether or not one of the AV and MV flags is "1". At this stage, since the AV flag=1, the control proceeds from step 419 to step 420, in which the operation-parameter data necessary for executing the scanning operation in the scanning mode [1] is read from the read-only memory (ROM) of the system control circuit 20. As mentioned above, the scanning mode [1] is suitable for reproduction of the image on the TV monitor 82, and thus the scanning mode [1] must be selected whenever performing the reproduction of the image on the TV monitor 82. Then, at step 421, a writing of video signals in a video-signal memory included in the video signal outputting circuit 74 is enabled.

Subsequently, the control proceeds from step 421 to step 501 (FIG. 28). Accordingly, the routine comprising the sequential steps for executing the scanning operation is carried out in the same manner as in the auto-photographing/recording mode (AP), except that the pixel signals read from the electro-developing recording medium 30 cannot be stored in the second recording medium, such as an IC memory, a floppy disk, a detachable hard disk or the like, loaded in the image recording device 67. Namely, the pixel signals read from the electro-developing recording medium 30 are successively converted into video signals, and are then written in the video-signal memory of the video signal outputting circuit 74. As shown in the timing chart of FIG. 24, as soon as the reading of the pixel signals from the line sensor 44 and the conversion of the read pixel signals into the video signals are carried out (reference "S40" in FIG. 24), the writing of the video signals in the video-signal memory of the video signal outputting circuit 74 is performed on the basis of clock pulses outputted from the recording device control circuit 66 (reference "S62" in FIG. 24). After the reading of the pixel signals from the electro-developing recording medium 30 and the writing of the video signals in the video-signal memory of the video signal outputting circuit 74 are completed, the routine comprising step 520 to 526 is carried out in the same manner as in the auto-photographing/recording mode (AP).

At step 527, when it is determined whether or not one of the AV and MV flags is "1", the control proceeds from step 527 to step 531, because of the AV flag=1. At step 531, the video signal outputting circuit 74 is energized, and then, at step 532, the video signals are outputted from the video-signal memory of the video signal outputting circuit 74 to the TV monitor 82 through the output terminal connector 17b, the interface connector 82a, and the cable extended therefrom (reference "S63" in FIG. 24), to thereby carry out a reproduction of the image on the TV monitor 82. Then, the control proceeds from step 532 to step 530, in which the release switch 14 is enabled. Thus, this routine is ended, i.e., the operation based upon the auto-video-monitor mode (AV) is finished.

When the release switch 14 has been turned ON after the manual-video-monitor mode (MV), the scanning operation is executed such that the read pixel signals are processed in and are transferred from the video signal outputting circuit 74 to the TV monitor 82, as mentioned.

In particular, the routine comprising step 301 to 307 is executed in the same manner as in the image-recording mode (IR), and the routine proceeds from step 308 to step 313, in which it is determined whether or not the interface connector 82a is connected to the output terminal connector 17b, and this determination is possible in the manner as explained above with reference to FIGS. 17 and 18; FIGS. 19 and 20; and FIG. 21.

If the connection of the interface connector 82a to the output terminal connector 17b is not detected, the control proceeds from step 313 to step 310, in which the release switch 14 is enabled. Thus, this routine is ended, i.e., the operation based upon the auto-video-monitor mode (AV) is erroneously finished.

If the connection of the interface connector 82a to the output terminal connector 17b is detected, the control proceeds from step 313 to step 314, in which it is determined whether or not an input or connection of the external power source is detected by the external power-input detecting circuit 87 of the main power source circuit 77. If the input or connection of the external power source is not detected, the control proceeds from step 314 to step 310, in which the release switch 14 is enabled. Namely, in this case, the operation based upon the auto-video-monitor mode (AV) is erroneously finished. As was already stated in the descriptions of the auto-video-monitor mode (AV), the electric power necessary for the transfer of the video signals to the TV monitor 82 is relatively large, resulting in prematurely consuming the internal battery 85, and the transfer of the video signals to the TV monitor 82 may be interrupted due to the premature consumption of the internal battery 85. Accordingly, the external power source has to be connected to the power source circuit 77 before the transfer of the video signals to the TV monitor 82 can be ensured.

If the input or connection of the external power source is detected, the control proceeds from step 314 to step 415 (FIG. 27), in which the scanning operation enabling (SOE) flag is set to be "1" to thereby enable the scanning operation. Accordingly, the routine comprising the sequential steps for executing the scanning operation is carried out in the same manner as in the auto-video-monitor mode (AV), and then the routine comprising step 520 to 526 is also carried out in the same manner.

At step 527, when it is determined whether or not one of the AV and MV flags is "1", the control proceeds from step 527 to step 531, because of the MV flag=1. Then, the reproduction of the image is carried out in the same manner as in the auto-video-monitor mode (AV). Thus, this routine is ended, i.e., the operation based upon the manual-video-monitor mode (MV) is finished.

When the release switch 14 has been turned ON after the image-erasing mode (IE), an execution of the image-erasing operation is carried out to thermally erase a recorded and developed image from the electro-developing recording medium 30 by moving the movable member 52 carrying the electric heater element 75a.

In particular, the routine comprising steps 301 to 306 is executed in the same manner as in the image-recording mode (IR), and the control proceeds from step 307 to step 601 (FIG. 30), because of the IE flag=1. At step 601, it is determined whether or not an input or connection of the external power source is detected by the external power-input detecting circuit 87 of the main power source circuit 77. If the input or connection of the external power source is not detected, the control proceeds from step 601 to step 612, in which the release switch 14 is enabled. Thus, this routine is ended. i.e., the operation based upon the image-erasing mode (IE) is erroneously finished. This is because the electric power necessary for the image-erasing operation is very large due to the use of the electric heater element 75a, resulting in prematurely consuming the internal battery 85. Accordingly, the external power source should be connected to the power source circuit 77 before the service life of the internal power battery 85 can be prolonged. Nevertheless, the step 601 may be eliminated from the flowchart of FIG. 30, so that the image-erasing operation can be executed whenever it is desired.

At step 601, if the input or connection of the external power source is detected, the control proceeds from step 601 to step 602, in which it is determined whether or not the image-erasing completion (IEC) flag is "0", i.e., whether or not the electro-developing recording medium 30 has an image recorded and developed therein. If the IEC flag=0, i.e., if the image-erasing operation has been already executed, the control proceeds from step 602 to step 612, in which the release switch 14 is enabled.

At step 602, if the IEC flag=1, the control proceeds from step 602 to step 603, in which the electric heater element 75a of the thermal erasing device 75 (FIG. 16) is powered ON, i.e., the transistor switch "T" is made ON to thereby electrically energize the electric heater element 75a. Then, the control proceeds to step 604, in which a scanner drive signal outputted from the system control circuit 20 to the scanner drive circuit 46 is changed from the zero level to the positive level, so that the scan drive motor 55 is driven in a forward direction due to the drive pulses outputted from the scanner drive circuit 46 thereto, whereby the movable member 52 of the scanning mechanism 50 starts to move up ward from the removal or initial position.

At step 605, it is determined whether or not a recording area of the electro-developing recording medium 30 has been entirely scanned with the thermal radiation emitted from the electric heater element 75a, to thereby erase a recorded and developed image from the recording area thereof. This determination can be carried out by, for example, counting the driving pulses outputted from the scanner drive circuit 46 to the scan drive motor 55. If the image has been thermally erased from the electro-developing recording medium 30, the control proceeds to step 606, in which the scanner drive signal outputted from the system control circuit 20 to the scanner drive circuit 46 is returned from the positive level to the zero level, and thus the output of the drive pulses from the scanner drive circuit 46 to the scan drive motor 55 is stopped, i.e., the scan drive motor 55 is stopped.

At step 607, the electric heater element 75a of the thermal erasing device 75 is powered OFF, i.e., the transistor switch "T" is made OFF. Then, the control goes from 607 to step 608, in which the scanner drive signal outputted from the system control circuit 20 to the scanner drive circuit 46 is changed from the zero level to the negative level, whereby the movable member 52 is reversely moved toward the removal or initial position.

At step 609, it is determined whether or not the movable member 52 has been moved to the initial position. If the movable member 52 reaches the removal or initial position, the control proceeds from step 609 to step 610, in which the scanner drive signal outputted from the system control circuit 20 to the scanner drive circuit 46 is returned from the negative level to the zero level, and thus the output of the drive pulses from the scanner drive circuit 46 to the scan drive motor 55 is stopped, i.e., the scan drive motor 55 is stopped. Subsequently, the control proceeds to step 611, in which the image-erasing flag (IEC) is set to be "1". Then, the control proceeds to step 612, in which the release switch 14 is enabled. Thus, this routine is ended, i.e., the operation based upon the image-erasing mode is finished.

In the second embodiment, in addition to the image-erasing completion (IEC) flag, a photographing-operation completion (POC) flag may be used. In this case, whenever the photographing-operation is completed, the POC flag is set to be "1" and the IEC flag is reset to be "0"(step 414), and, whenever the image-erasing operation is completed, the POC flag is reset to be "0" and the IEC flag is set to be "1"(step 611).

Note that the electro-developing recording medium 30 is not restricted to the structure described above, and may be any other structure by which an image is electronically developed.

The present invention is not restricted to a single-lens reflex camera described above, but can be applied to a lens shutter camera. Note that, when the present invention is applied to the lens shutter camera, the shutter 22 need not be provided, as in the above described embodiment.

A single lens, a micro-lens array, a rod lens array and so on may be used for the scanner optical system 43.

The line sensor 44 may be disposed in such a manner that a light beam reflected by the electro-developing recording medium 30 is sensed.

Finally, it will be understood by those skilled in the art that the foregoing description is of preferred embodiments of the disclosed electronic still video camera, and that various changes and modifications may be made to the present invention without departing from the spirit and scope thereof.

The present disclosure relates to subject matter contained in Japanese Patent Applications No. 6-335971 (filed on Dec. 22, 1994), No. 6-335974 (filed on Dec. 22, 1994), No. 6-335975 (filed on Dec. 22, 1994), No. 6-335977 (filed on Dec. 22, 1994), and No. 6-335978 (filed on Dec. 22, 1994), which are expressly incorporated herein, by reference, in their entirety.

I claim:

1. An electronics still video camera having an electro-developing recording medium, comprising:

a photographing optical system that forms an optical image as a still image on said electro-developing recording medium to record and develop said optical image therein;

a first controller that controls said formation of said optical image on said electro-developing recording medium;

a manual photographing-start switch that initiates said first controller to form said optical image on said electro-developing recording medium when said manual photographing-start switch is operated;

an image-sensing device that optically senses and obtains image data from said recorded optical image of said electro-developing recording medium;

a second controller that controls said sensing of said image data from said recorded optical image of said electro-developing recording medium;

a manual image-sensing-start switch that initiates said second controller to sense said image data from said recorded optical image of said electro-developing recording medium when said manual image-sensing-start switch is operated;

a photographing-disabler that disables initiation of said first controller by an operation of said manual photographing-start switch while said second controller is initiated by an operation of said manual image-sensing-start switch; and an image-sensing-disabler that disables initiation of said second controller by an operation of said manual image-sensing-start switch while said first controller controls said formation of said optical image on said electro-developing recording medium by an operation of said manual photographing-start switch.

2. An electronic still video camera as set forth in claim 1, wherein said image-sensing device comprises a line image sensor, said sensing of said image data from said recorded image of said electro-developing recording medium being carried out by scanning said recorded image with said line image sensor.

3. An electronic still video camera as set forth in claim 1, wherein said image-sensing device includes a movable member, a light source supported by said movable member that is disposed on one side of said electro-developing recording medium, a line image sensor supported by said movable member that is disposed on another side of said electro-developing recording medium to be aligned with said light source, and an optical system supported by said movable member that is disposed between said electro-developing recording medium and said line image sensor, said movable member being intermittently moved at regular intervals in a scanning direction.

4. An electronic still video camera as set forth in claim 3, wherein said light source comprises a plurality of light emitting diodes aligned with each other, and a collimater lens for converting light beams, emitted therefrom, into parallel light beams.

5. An electronic still video camera as set forth in claim 1, wherein said electro-developing recording medium comprises an electrostatic information recording medium and an electric charge keeping medium.

6. An electronic still video camera as set forth in claim 5, wherein said electrostatic information recording medium includes a photoconducting layer and an inorganic oxide material layer, and said electric charge keeping medium includes a liquid crystal display.

7. An electronic still video camera as set forth in claim 6, wherein said liquid crystal display comprises a memory type liquid crystal display.

8. An electronic still video camera as set forth in claim 1, further comprising a storing device that stores said image data sensed from said recorded image of said electro-developing recording medium.

9. An electronic still video camera as set forth in claim 8, wherein said storing device comprises a second recording medium, and a recorder for loading and driving said second recording medium, to thereby store said image data therein.

10. An electronic still video camera having an electro-developing recording medium, comprising:

a photographing optical system that forms an optical image as a still image on said electro-developing recording medium to record and develop said optical image therein;

a first controller that controls said formation of said optical image on said electro-developing recording medium:

an image-sensing device that optically senses and obtains image data from said recorded optical image of said electro-developing recording medium;

a second controller that controls said sensing of said image data from said recorded optical image of said electro-developing recording medium.

a manual switch that selectively initiates one of said first controller and said second controller when said manual switch is operated, whereby a corresponding one of said formation of said optical image on said electro-developing recording medium and said sensing of said image data from said recorded optical image of said electro-developing recording medium is made possible; and a selector that selects which controller should be initiated by an operation of said manual switch.

11. An electronic still video camera as set forth in claim 10, wherein said image-sensing device comprises a line image sensor, said sensing of said image data from said recorded optical image of said electro-developing recording medium being carried out by scanning said recorded optical image with said line image sensor.

12. An electronic still video camera as set forth in claim 10, wherein said image-sensing device includes a movable member, a light source supported by said movable member that is disposed on one side of said electro-developing recording medium, a line image sensor supported by said movable member that is disposed on another side of said electro-developing recording medium to be aligned with said light source, and an optical system supported by said movable member that is disposed between said electro-developing recording medium and said line image sensor, said movable member being intermittently moved at regular intervals in a scanning direction.

13. An electronic still video camera as set forth in claim 12, wherein said light source comprises a plurality of light emitting diodes aligned with each other, and a collimater lens for converting light beams, emitted therefrom, into parallel light beams.

14. An electronic still video camera as set forth in claim 10, wherein said electro-developing recording medium comprises an electrostatic information recording medium and an electric charge keeping medium.

15. An electronic still video camera as set forth in claim 14, wherein said electrostatic information recording medium includes a photoconducting layer and an inorganic oxide material layer, and said electric charge keeping medium includes a liquid crystal display.

16. An electronic still video camera as set forth in claim 15, wherein said liquid crystal display comprises a memory type liquid crystal display.

17. An electronic still video camera as set forth in claim 10, further comprising a storing device for storing said image data sensed from said recorded optical image of said electro-developing recording medium.

18. An electronic still video camera as set forth in claim 17, wherein said storing device comprises a second recording medium, and a recorder for loading and driving said second recording medium, to thereby store said image data therein.

19. An electronic still video camera having an electro-developing recording medium, comprising:
- a photographing optical system that forms an optical image as a still image on said electro-developing recording medium to record and develop said optical image therein;
- a first controller that controls said formation of said optical image on said electro-developing recording medium;
- an image-erasing device that erases said recorded optical image from said electro-developing recording medium;
- a second controller that controls said erasing of said recorded optical image from said electro-developing recording medium;
- a manual switch that selectively initiates one of said first controller and said second controller when said manual switch is operated, whereby a corresponding one of said formation of said optical image on said electro-developing recording medium and said erasing of said recorded optical image from said electro-developing recording medium is made possible; and
- a selector that selects which controller should be initiated by an operation of said manual switch.

20. An electronic still video camera as set forth in claim 19, further comprising an image-sensing device that optically senses and obtains image data from said recorded optical image of said electro-developing recording medium.

21. An electronic still video camera as set forth in claim 19, wherein said image-sensing device includes said image-erasing device, which is electrically energized only during said erasing of said recorded image from said electro-developing recording medium.

22. An electronic still video camera as set forth in claim 19, wherein said image-sensing device comprises a line image sensor, said sensing of said image data from said recorded image of said electro-developing recording medium being carried out by scanning said recorded image with said line image sensor.

23. An electronic still video camera as set forth in claim 19, wherein said image-sensing device includes a movable member, a light source supported by said movable member that is disposed on one side of said electro-developing recording medium, a line image sensor supported by said movable member that is disposed on another side of said electro-developing recording medium to be aligned with said light source, and an optical system supported by said movable member that is disposed between said electro-developing recording medium and said line image sensor, said movable member being intermittently moved at regular intervals in a scanning direction.

24. An electronic still video camera as set forth in claim 23, wherein said image-erasing device includes an electric heater element supported by said movable member of said image-sensing means.

25. An electronic still video camera as set forth in claim 23, wherein said light source comprises a plurality of light emitting diodes aligned with each other, and a collimater lens for converting light beams, emitted therefrom, into parallel light beams.

26. An electronic still video camera as set forth in claim 23, wherein said electro-developing recording medium comprises an electrostatic information recording medium and an electric charge keeping medium.

27. An electronic still video camera as set forth in claim 26, wherein said electrostatic information recording medium includes a photoconducting layer and an inorganic oxide material layer, and said electric charge keeping medium includes a liquid crystal display.

28. An electronic still video camera as set forth in claim 27, wherein said liquid crystal display comprises a memory type liquid crystal display.

29. An electronic still video camera as set forth in claim 19, further comprising a storing device that stores said image data sensed from said recorded image of said electro-developing recording medium.

30. An electronic still video camera as set forth in claim 29, wherein said storing device comprises a second recording medium, and a recorder for loading and driving said second recording medium, to thereby store said image data therein.

31. An electronic still video camera having an electro-developing recording medium, comprising:
- a photographing optical system that forms an optical image as a still image on said electro-developing recording medium to record and develop said optical image therein;
- a first controller that controls said formation of said optical image on said electro-developing recording medium;
- an image-sensing device that optically senses and obtains image data from said recorded optical image of said electro-developing recording medium;
- a second controller that controls said sensing of said image data from said recorded optical image of said electro-developing recording medium;
- an image-erasing device that erases said recorded optical image from said electro-developing recording medium;
- a third controller that controls said erasing of said recorded optical image from said electro-developing recording medium;
- a manual switch that selectively initiates one of said first controller, said second controller, and said third controller when said manual switch is operated, whereby a corresponding one of said formation of said optical image on said electro-developing recording medium, said sensing of said image data from said recorded optical image of said electro-developing recording medium and said erasing of said recorded optical image from said electro-developing recording medium is made possible; and
- a selector that selects which one of said first controller, said second controller and said third controller should be initiated by an operation of said manual switch.

32. An electronic still video camera as set forth in claim 31, wherein said image-sensing device includes said image-erasing device, which is electronically energized only during said erasing of said recorded optical image from said electro-developing recording medium.

33. An electronic still video camera as set forth in claim 31, wherein said image-sensing device comprises a line image sensor, said sensing of said image data from said recorded optical image or said electro-developing recording medium being carried out by scanning said recorded image with said line image sensor.

34. An electronic still video camera as set forth in claim 31, wherein said image-sensing device includes a movable member, a light source supported by said movable member that is disposed on one side of said electro-developing recording medium, a line image sensor supported by said movable member that is disposed on another side of said electro-developing recording medium to be aligned with said light source, and an optical system supported by said movable member that is disposed between said electro-developing recording medium and said line image sensor, said movable member being intermittently moved at regular intervals in a scanning direction.

35. An electronic still video camera as set forth in claim 34, wherein said image-erasing device includes an electric heater element supported by the movable member of said image-sensing device.

36. An electronic still video camera as set forth in claim 34, wherein said light source comprises a plurality of light emitting diodes aligned with each other, and a collimater lens for converting light beams, emitted therefrom, into parallel light beams.

37. An electronic still video camera as set forth in claim 31, wherein said electro-developing recording medium comprises an electrostatic information recording medium and an electric charge keeping medium.

38. An electronic still video camera as set forth in claim 37, wherein said electrostatic information recording medium includes a photoconducting layer and an inorganic oxide material layer, and said electric charge keeping medium includes a liquid crystal display.

39. An electronic still video camera as set forth in claim 38, wherein said liquid crystal display comprises a memory type liquid crystal display.

40. An electronic still video camera as set forth in claim 34, further comprising a storing device for storing said image data sensed from said recorded optical image of said electro-developing medium.

41. An electronic still video camera as set forth in claim 40, wherein said storing device comprises a second recording medium, and a recorder for loading and driving said second recording medium, to thereby store the image data therein.

42. An electronic still video camera having an electro-developing recording medium, comprising:
 a photographing optical system that forms an optical image as a still image on said electro-developing recording medium to record and develop said optical image therein;
 a first controller that controls of said formation of said optical image on said electro-developing recording medium;
 an image-sensing device that optically senses and obtains image data from said recorded optical image of said electro-developing recording medium;
 a second controller that controls said sensing of said image data from said recorded optical image of said electro-developing recording medium;
 a transferring device that transfers said image data to an external device;
 a third controller that controls said transfer of said image data to said external device;
 a detector that detects a connection between said camera and said external device for the transfer of the image data to said external device;
 a manual switch that selectively initiates at least one of a first sequential operation and a second sequential operation when said manual switch is operated, said first sequential operation including said formation of said optical image on said electro-developing recording medium, said sensing of said image data from said recorded optical image of said electro-developing recording medium and said transfer of said image data to said external device, said second sequential operation including said sensing of said image data from said recorded optical image of said electro-developing recording medium and said transfer of said image data to said external device;
 a selector that selects which sequential operation should be selected;
 a first disabler that disables said formation of said optical image on said electro-developing recording medium, said sensing of said image data from said recorded optical image of said electro-developing recording medium and said transfer of said image data to said external device when detecting that said connection between said camera and said external device by said detector is irregular, regardless of a selected initiation of said first sequential operation by said selector; and
 a second disabler that disables said sensing of said image data from said recorded optical image of said electro-developing recording medium and said transfer of said image data to said external device when detecting that said connection between said camera and said external device by said detector is irregular, regardless of a selected initiation of said second sequential operation by said selector.

43. An electronic still video camera as set forth in claim 42, wherein said detector includes a terminal having an electric potential, and another terminal that is grounded, and a movable conductive element for establishing a connection therebetween, said movable conductive element being moved to and contacted with said terminals when establishing said connection between said camera and said external device.

44. An electronic still video camera as set forth in claim 42, wherein said electro-developing recording comprises an electrostatic information recording medium and an electric charge keeping medium.

45. An electronic still video camera as set forth in claim 44, wherein said electrostatic information recording medium includes a photoconducting layer and an inorganic oxide material layer, said electric charge keeping medium including a liquid crystal display.

46. An electronic still video camera as set forth in claim 45, wherein said liquid crystal display comprises a memory type liquid crystal display.

47. An electronic still video camera as set forth in claim 42, further comprising a storing device for storing said image data sensed from said recorded optical image of said electro-developing recording medium.

48. An electronic still video camera as set forth in claim 47, wherein said storing device comprises a second recording medium and a recorder for loading and driving said second recording loaded therein, to thereby store said image data therein.

49. An electronic still video camera as set forth in claim 42, wherein said external device comprises an image data processor device for processing said transferred image data.

50. An electronic still video camera as set forth in claim 42, wherein said external device comprises a monitor device for reproducing said optical image on said basis of the transferred image data.

* * * * *

UNITED STATES PATENT AND TRADEMARK OFFICE
CERTIFICATE OF CORRECTION

PATENT NO. : 5,842,050
DATED : November 24, 1998
INVENTOR(S) : H. AOKI

It is certified that error appears in the above-identified patent and that said Letters Patent is hereby corrected as shown below:

At column 39, line 35 (claim 40, line 2) of the printed patent, "34" should be ---31---;

At column 39, line 37 (claim 40, line 4) of the printed patent, before "medium" insert ---recording---;

At column 40, line 39 (claim 44, line 2) of the printed patent, after "recording" insert ---medium---; and At column 40, line 57 (claim 48, line 4) of the printed patent, after "recording" insert ---medium---.

Signed and Sealed this

Twenty-eighth Day of December, 1999

Attest:

Q. TODD DICKINSON

Attesting Officer    Acting Commissioner of Patents and Trademarks